United States Patent
Funao

(10) Patent No.: US 9,160,937 B2
(45) Date of Patent: Oct. 13, 2015

(54) SIGNAL PROCESSING APPARATUS AND SIGNAL PROCESSING METHOD, SOLID-STATE IMAGING APPARATUS, ELECTRONIC INFORMATION DEVICE, SIGNAL PROCESSING PROGRAM, AND COMPUTER READABLE STORAGE MEDIUM

(75) Inventor: Daisuke Funao, Osaka (JP)

(73) Assignee: Sharp Kabushika Kaisha, Osaka (JP)

( * ) Notice: Subject to any disclaimer, the term of this patent is extended or adjusted under 35 U.S.C. 154(b) by 92 days.

(21) Appl. No.: 14/239,009

(22) PCT Filed: Jul. 24, 2012

(86) PCT No.: PCT/JP2012/004692
§ 371 (c)(1),
(2), (4) Date: Feb. 14, 2014

(87) PCT Pub. No.: WO2013/031081
PCT Pub. Date: Mar. 7, 2013

(65) Prior Publication Data
US 2014/0211060 A1 Jul. 31, 2014

(30) Foreign Application Priority Data
Aug. 30, 2011 (JP) .................................. 2011-187830

(51) Int. Cl.
*H04N 5/243* (2006.01)
*H04N 5/232* (2006.01)
*G06T 3/40* (2006.01)
*H04N 9/04* (2006.01)

(52) U.S. Cl.
CPC .............. *H04N 5/243* (2013.01); *G06T 3/4015* (2013.01); *H04N 5/23229* (2013.01); *G06T 3/403* (2013.01); *G06T 3/4007* (2013.01); *H04N 9/045* (2013.01)

(58) Field of Classification Search
None
See application file for complete search history.

(56) References Cited

U.S. PATENT DOCUMENTS

| | | | | |
|---|---|---|---|---|
| 2007/0013794 | A1* | 1/2007 | Tsuruoka | 348/241 |
| 2008/0298722 | A1* | 12/2008 | Lee et al. | 382/300 |
| 2011/0234844 | A1* | 9/2011 | Arai | 348/223.1 |
| 2013/0002902 | A1* | 1/2013 | Ito | 348/224.1 |
| 2013/0002936 | A1* | 1/2013 | Hirama et al. | 348/349 |

FOREIGN PATENT DOCUMENTS

JP 2001320720 A * 11/2001

* cited by examiner

*Primary Examiner* — Justin P Misleh
(74) *Attorney, Agent, or Firm* — Keating & Bennett, LLP

(57) ABSTRACT

A signal processing apparatus 100 is achieved, capable of processing an analog pixel signal Ag obtained by photoelectric conversion in a CCD image sensor 1 such that noise will be reduced and S/N will be improved by interpolation in an area with low brightness or saturation on a display screen and resolution will be increased by edge emphasis in an area with high brightness or saturation on the display screen. The signal processing apparatus 100 for performing A/D conversion on the analog pixel signal Ag from the CCD image sensor 1, comprises an interpolation processing section 104 for adaptively switching interpolation processing for determining brightness or saturation of pixels for each pixel, and calculating a digital pixel signal of a target pixel from pixel signals of peripheral pixels positioned in the periphery of the target pixel based on the determined brightness or saturation of the target pixel.

19 Claims, 18 Drawing Sheets

FIG. 1
(a)
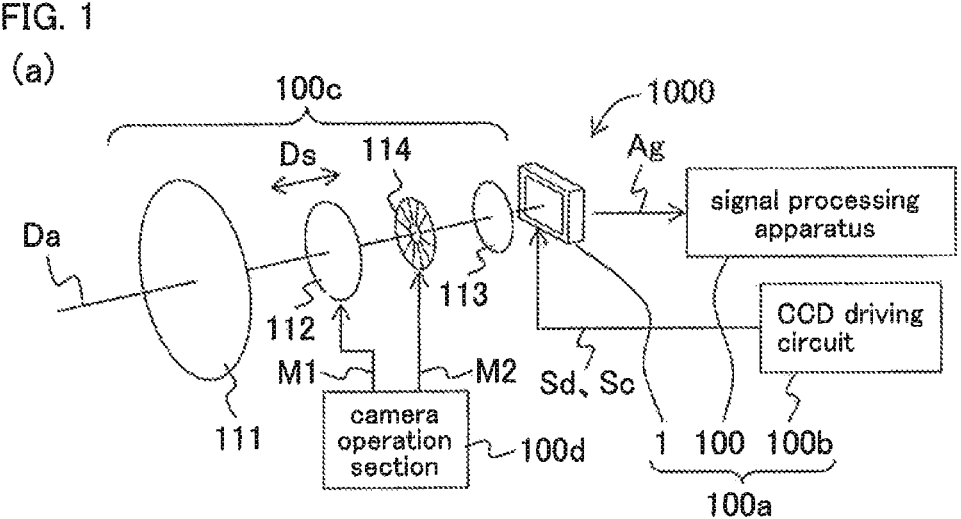
(b)
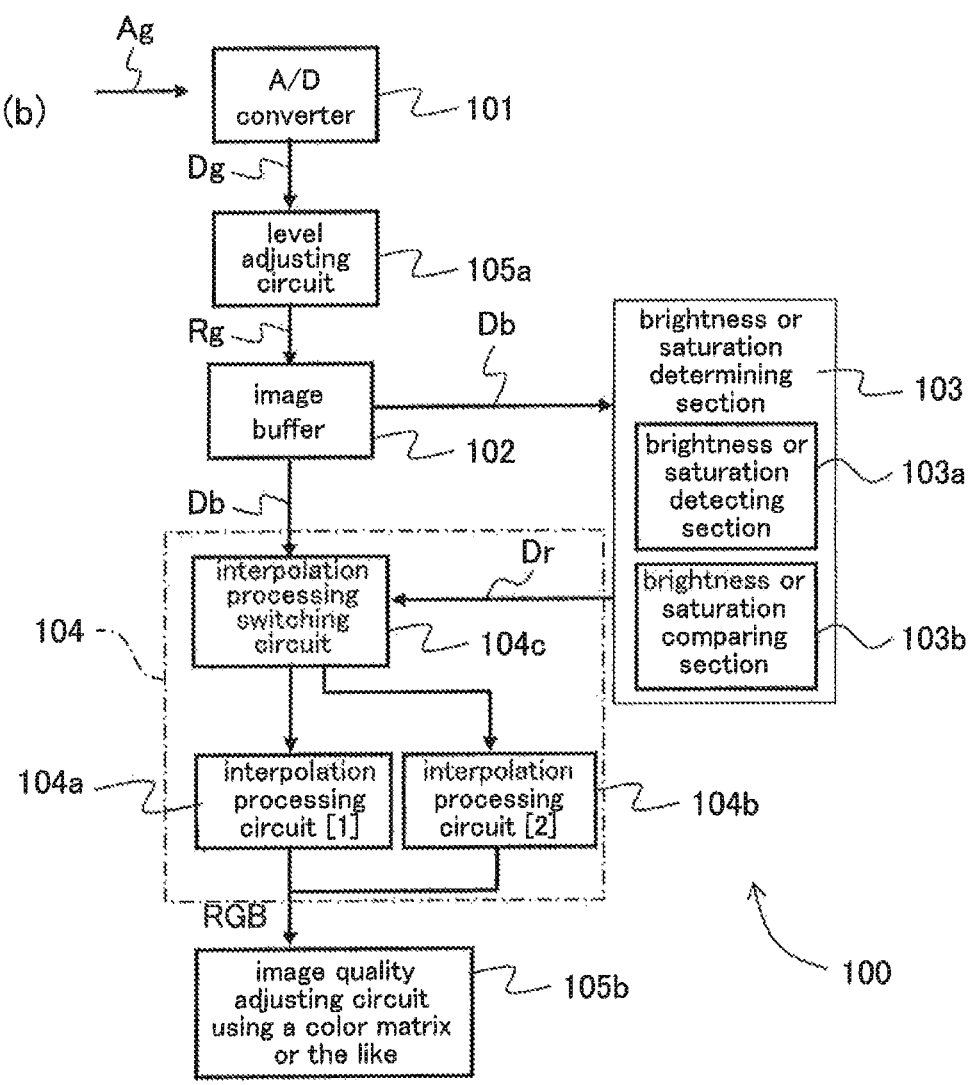

FIG. 4
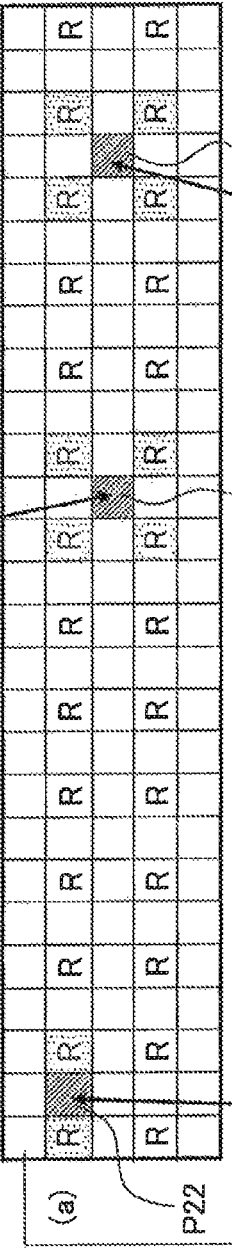
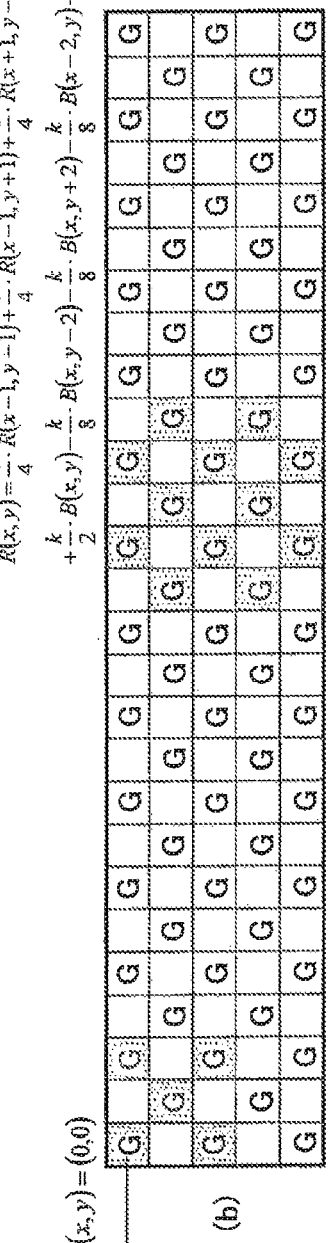
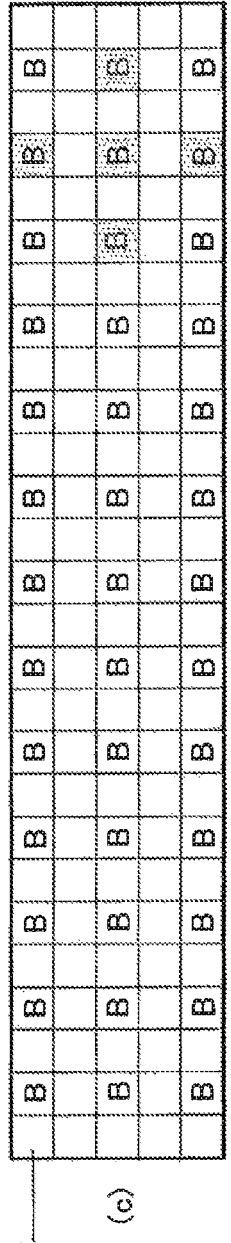

FIG. 5
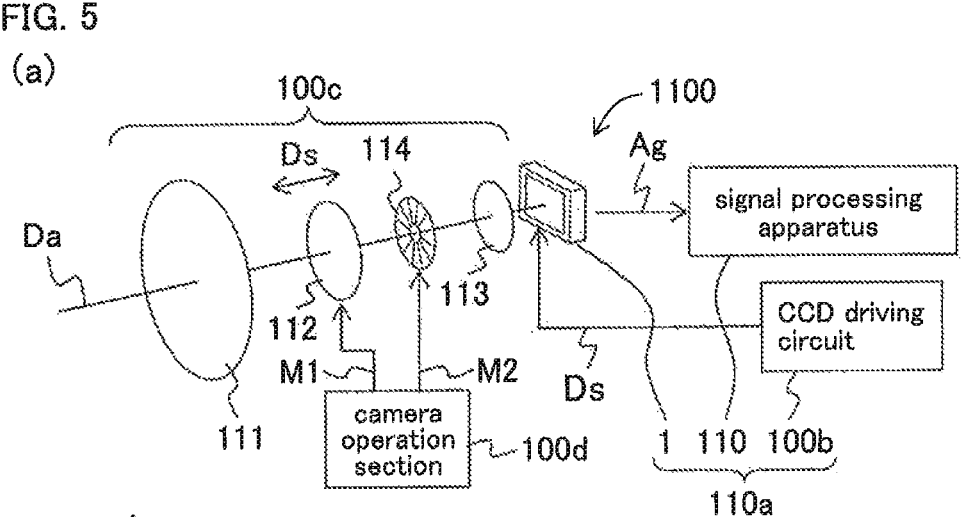
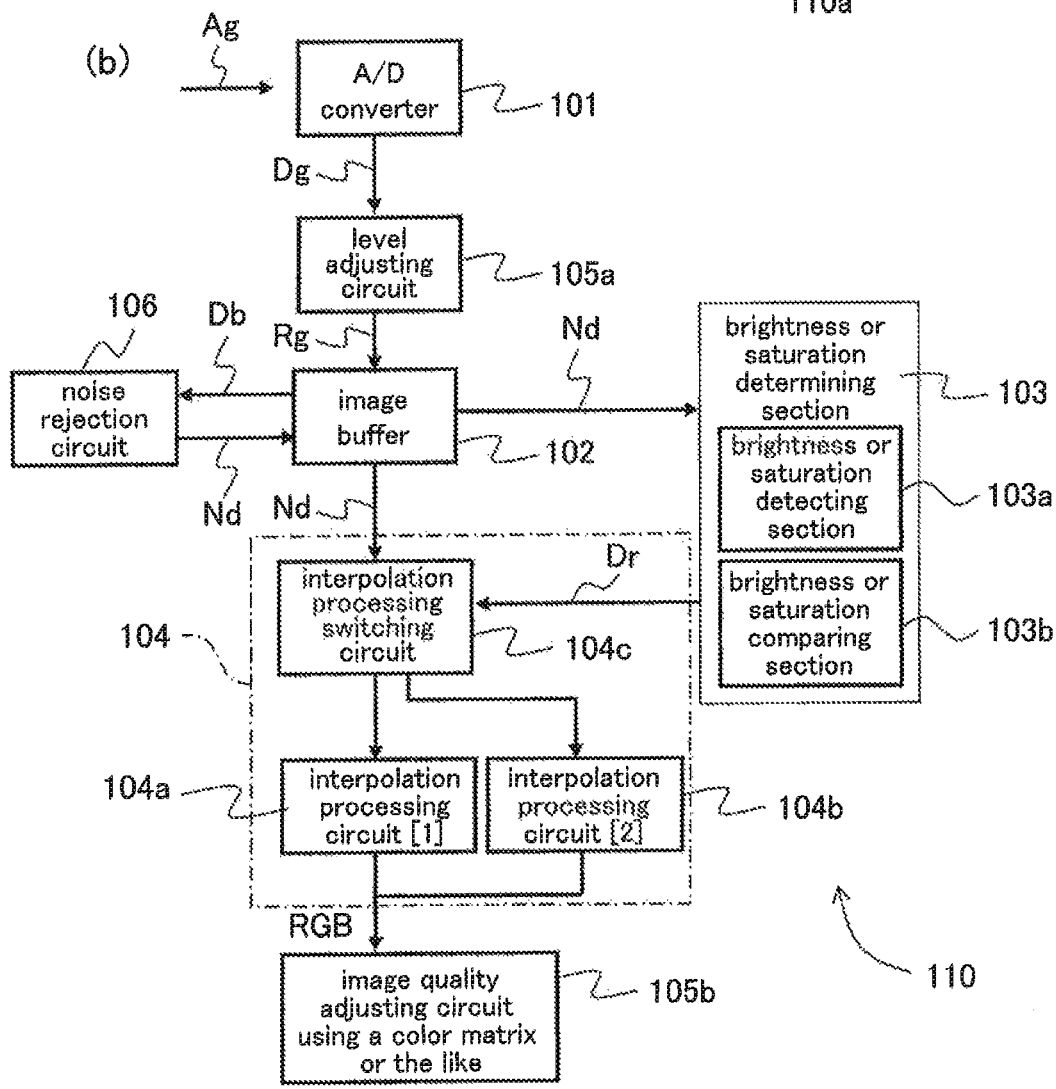

FIG. 6
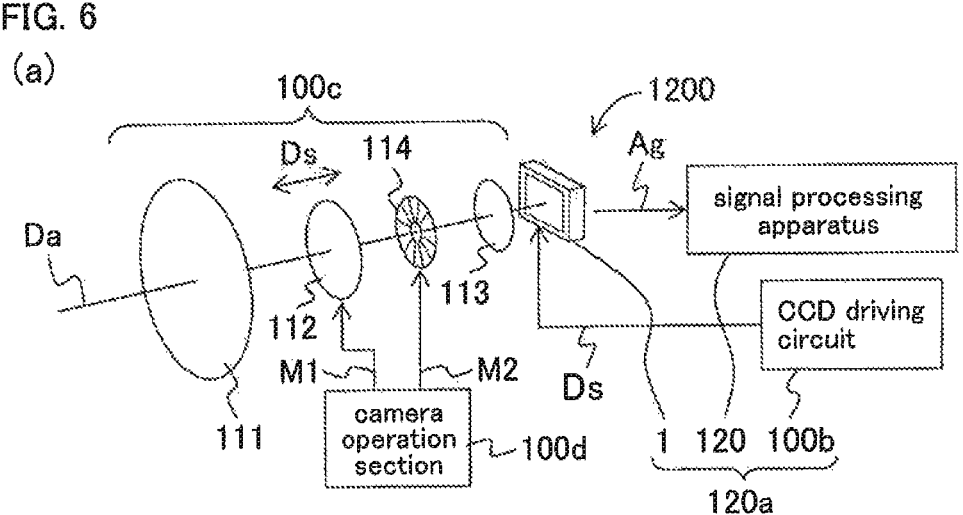
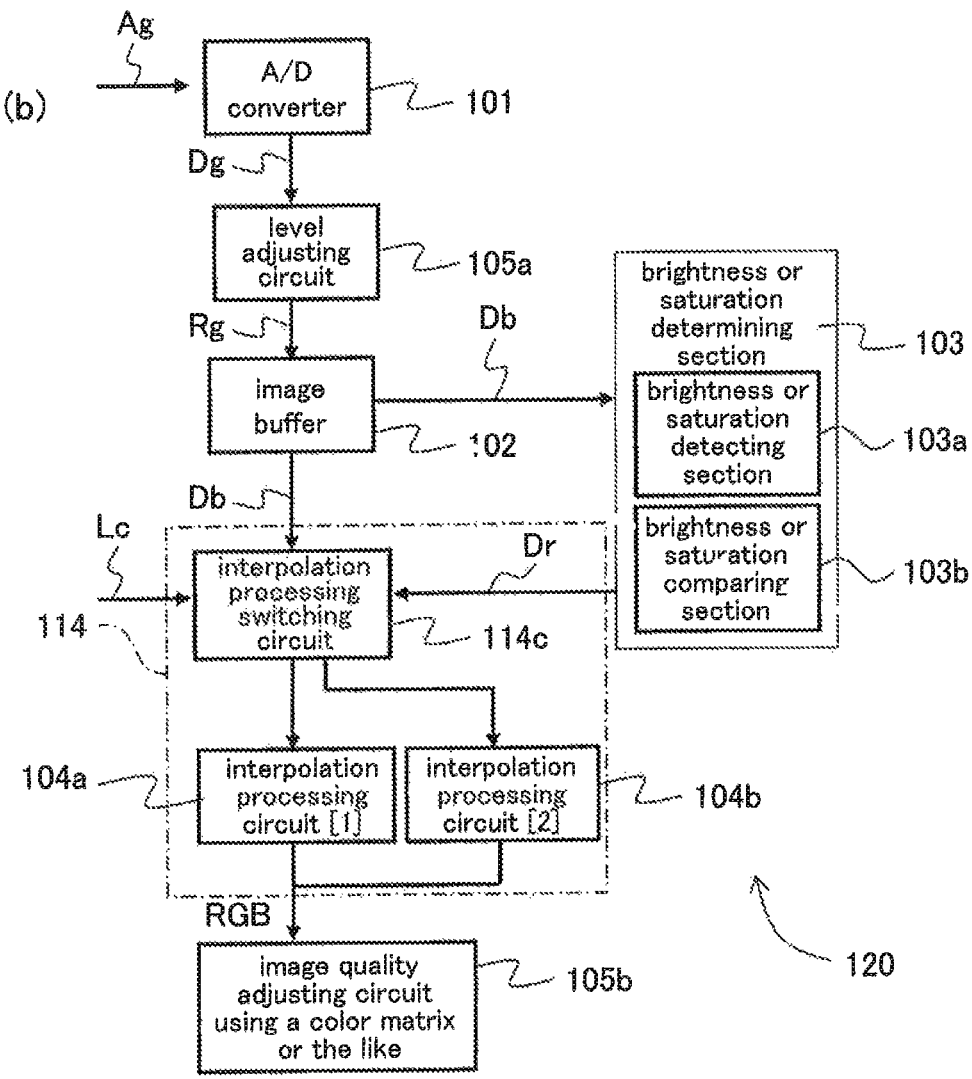

FIG. 7
(a)
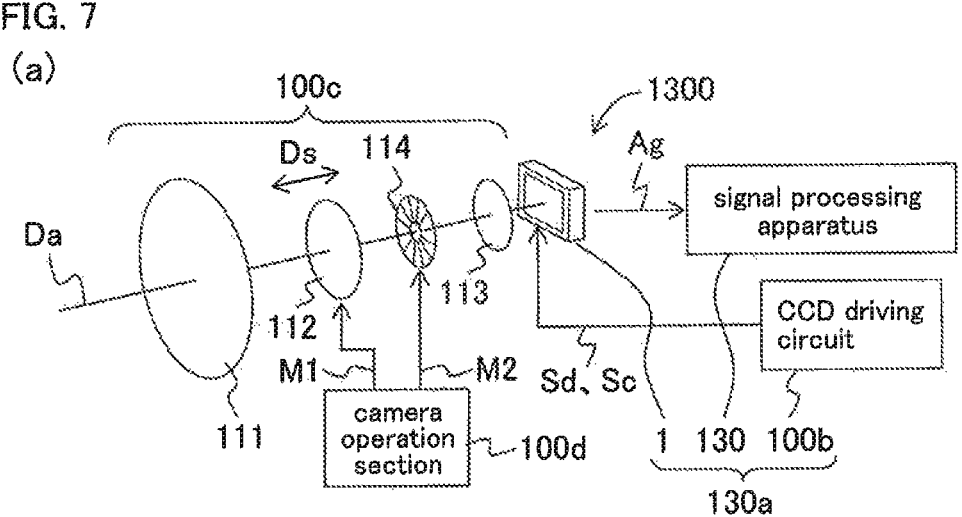
(b)
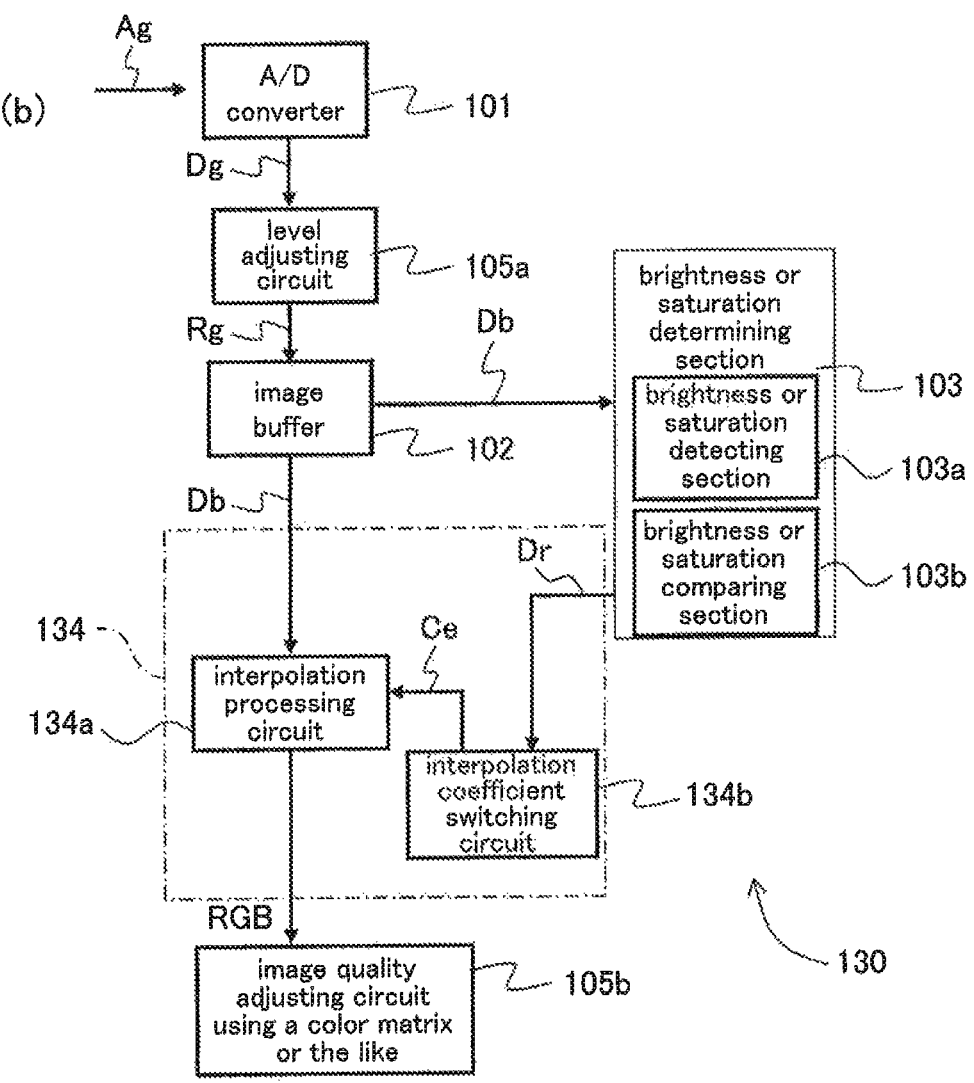

$$G(x,y) = \frac{1}{2} \cdot G(x, y-1) + \frac{1}{2} \cdot G(x, y+1) + \frac{1}{2} \cdot G(x-1, y) + \frac{1}{2} \cdot G(x+1, y)$$
$$- \frac{1}{8} G(x-2, y-1) - \frac{1}{8} G(x-2, y+1) - \frac{1}{8} G(x-1, y-2) - \frac{1}{8} G(x-1, y+2) - \frac{1}{8} G(x+1, y-2) - \frac{1}{8} G(x+1, y+2) - \frac{1}{8} G(x+2, y-1) - \frac{1}{8} G(x+2, y+1) \quad \text{—formula (6)}$$

(a) $R(x,y) = \frac{1}{2} \cdot R(x,y) + \frac{1}{8} \cdot R(x,y-2) + \frac{1}{8} \cdot R(x,y+2) + \frac{1}{8} \cdot R(x-2,y) + \frac{1}{8} \cdot R(x+2,y)$ —formula (10a)

(b) $G(x,y) = \frac{1}{2} \cdot G(x,y) + \frac{1}{8} \cdot G(x-1,y-1) + \frac{1}{8} \cdot G(x-1,y+1) + \frac{1}{8} \cdot G(x+1,y-1) + \frac{1}{8} \cdot G(x+1,y+1)$ —formula (10b)

$G(x,y) = \frac{1}{4} \cdot G(x,y) + \frac{1}{8} \cdot G(x,y-2) + \frac{1}{8} \cdot G(x,y+2) + \frac{1}{16} \cdot G(x-2,y) + \frac{1}{16} \cdot G(x+2,y) + \frac{1}{16} \cdot G(x-1,y-1) + \frac{1}{16} \cdot G(x-1,y+1) + \frac{1}{16} \cdot G(x+1,y-1) + \frac{1}{16} \cdot G(x+1,y+1)$ —formula (10c)

(c) $B(x,y) = \frac{1}{2} \cdot B(x,y) + \frac{1}{8} \cdot B(x,y-2) + \frac{1}{8} \cdot B(x,y+2) + \frac{1}{8} \cdot B(x-2,y) + \frac{1}{8} \cdot B(x+2,y)$ —formula (10d)

SIGNAL PROCESSING APPARATUS AND SIGNAL PROCESSING METHOD, SOLID-STATE IMAGING APPARATUS, ELECTRONIC INFORMATION DEVICE, SIGNAL PROCESSING PROGRAM, AND COMPUTER READABLE STORAGE MEDIUM

CROSS-REFERENCE TO RELATED APPLICATIONS

This application is a National Phase application filed under 35 USC 371 of PCT International Application No. PCT/JP2012/004692 with an International Filing Date of Jul. 24, 2012, which claims under 35 U.S.C. §119(a) the benefit of Japanese Application No. 2011-187830, filed Aug. 30, 2011, the entire contents of which are incorporated herein by reference.

TECHNICAL FIELD

The present invention relates to a signal processing apparatus and a signal processing method, a solid-state imaging apparatus, an electronic information device, a signal processing program, and a computer readable storage medium. More particularly, the present invention relates to a signal processing apparatus and a signal processing method for adaptively switching interpolations of pixel signals between a bright area and a dark area on a screen; a solid state imaging apparatus equipped with the signal processing apparatus; an electronic information device equipped with the solid-state imaging apparatus; a signal processing program for allowing a computer to execute the signal processing method; and a computer readable storage medium for recording the signal processing program.

BACKGROUND ART

For digital cameras, solid-state imaging apparatuses, such as a CCD solid-state imaging apparatus and a CMOS solid-state imaging apparatus, have been conventionally used, for photoeleotrically converting light from a subject (hereinafter, also referred to as subject light) and generating image signals of the subject to capture an image of the subject.

FIG. 10 is a diagram for describing a conventional CCD solid-state imaging apparatus. FIG. 10(a) schematically shows an overall configuration of the conventional solid-state imaging apparatus. FIG. 10(b) shows a CCD image sensor constituting the solid-state imaging apparatus. FIG. 10(c) shows an arrangement of color filters in the solid-state imaging apparatus (part A in FIG. 10(b)).

A CCD solid-state imaging apparatus 200a comprises a CCD image sensor 1 for photometrically converting light from a subject to output pixel signals, and a signal processing apparatus 200 for AD converting analog pixel signals Ag output from the image sensor 1 and performing signal processing on thus obtained digital image signals.

As shown in FIG. 10(b), the CCD image sensor 1 comprises: a pixel section 1a composed of a plurality of pixels P arranged in a matrix; a vertical electric charge transfer section (vertical CCD) 1b disposed along each pixel column of the pixel section 1a, for transferring signal charges, obtained by photoelectric conversion of light from a subject at each pixel, in a vertical direction Y; a reading gate section 2 disposed between the vertical CCD 1b and a pixel P in a corresponding pixel column; a horizontal electric charge transfer section (horizontal CCD) 1c, disposed at one end of the vertical CCD 1b, for transferring signal charges from the vertical CCD 1b in a horizontal direction X; and an output section 3 for converting signal charges from the horizontal CCD 1c into voltage signals and for amplifying the voltage signals and outputting them as analog pixel signals. Herein, the vertical CCD 1b is configured to be driven by four-phase vertical transfer signals $\phi V1$ to $\phi V4$ from a CCD driving circuit (not shown), and the horizontal CCD 1c is configured to be driven by two-phase horizontal transfer signals $\phi H1$ and H2 from the CCD driving circuit (not shown).

Each of the pixels, which constitute the pixel section 1a, comprises a photodiode formed on a semiconductor substrate. A color filter such as R (red), G (green) or B (blue) is provided in a region where the photodiode is formed. In accordance with the color of the color filter, each pixel is a R pixel for outputting a red pixel signal (R pixel value), a G pixel for outputting a green pixel signal (G pixel value), or a B pixel for outputting a blue pixel signal (B pixel value).

FIG. 10(c) shows an arrangement of color filters in a part A of the pixel section 1a shown in FIG. 10(a). In the CCD image sensor 1, the arrangement of the color filters is the one referred to as Bayer arrangement. Specifically, green filters Fg are provided in a checkered pattern in relation to the pixels P that are arranged in a matrix, and blue filters Fb and red filters Fr are arranged alternately along pixel columns or pixel rows to fill the spaces between the green filters Fg.

The signal processing apparatus 200 also performs A/D conversion on the analog pixel signals Ag output from the CCD image sensor 1, and performs signal processing on the obtained digital pixel signals. The signal processing apparatus 200 is configured to perform various types of processing, such as adjusting a black level, adjusting a white balance, a pixel interpolation, color matrix processing, adjusting contrast, gamma control, for digital pixel signals.

Next, the operation of the signal processing apparatus 200 will be described.

In the CCD solid-state imaging apparatus 200a with such a configuration, the CCD image sensor 1 photoelectrically converts light from a subject to generate analog pixel signals Ag, and outputs the analog pixel signals Ag to the signal processing apparatus 200.

Specifically, the subject light that has entered the CCD image sensor 1 is photoelectrically converted at each of the pixels P of the pixel section 1a, and signal charges generated by photoelectric conversion are read out from each of the pixels P via the reading gate section 2 to the vertical CCD 1b. In the vertical CCD 1b, the signal charges are transferred in the vertical direction Y, while in the horizontal CCD 1a, the signal charges transferred from the vertical CCD 1b are transferred in the horizontal direction X. At the output section 3 on a terminal side of the horizontal CCD 1c, the signal charges are converted into voltage signals and output to the signal processing apparatus 200 as analog pixel signals Ag. The signal processing apparatus 200 performs various types of signal processing on the analog pixel signals Ag.

FIG. 11 is a diagram for describing specific signal processing in a signal processing apparatus 200, where a typical flow of image processing is shown starting from A/D conversion processing.

The signal processing apparatus 200 coverts signal charges from pixels into voltage signals, coverts thus obtained analog pixel signals into digital pixel signals, and performs signal processing on the digital pixel signals to generate color image signals that have been through image processing.

In the signal processing apparatus 200, first, the analog pixel signals Ag output from the CCD image sensor 1 are converted into digital pixel signals by an A/D converter (not shown) (step S1), and processing for adjusting a black level is performed, such as fixing the black level of digital pixel signals corresponding to pixels of respective colors to a prescribed value (step S2).

Next, processing for adjusting white balance is performed by multiplying digital pixel signals of R pixels and B pixels among digital pixel signals with the adjusted black level, by a predetermined value. More specifically, gain of the digital pixel signals is adjusted so that signal levels of the digital pixel signals of respective R, G and B pixels will be equal to one another when an image of a white subject is captured (step S3).

Thereafter, interpolation processing on pixel signals corresponding to respective signals, i.e., processing of obtaining, for the respective pixels, pixel signals of colors other than the colors of the color filters that the pixels have is performed. Each of the pixels has only an element (digital pixel signal) of one of red, green and blue colors. Thus, by this interpolation processing, elements (digital pixel signals) of other colors corresponding to respective pixels are obtained by an interpolation from surrounding pixels (step S4).

For example, since a R pixel has only a digital pixel signal of a red color, a digital pixel signal of a green color and a digital pixel signal of a blue color for the R pixel are generated from a digital pixel signal of a G pixel and a digital pixel signal of a B pixel in the periphery. Similarly, since a G pixel and a B pixel have only a digital pixel signal of a green color and a digital pixel signal of a blue color respectively, digital pixel signals of the other colors are generated from digital pixel signals of pixels of the other colors.

Subsequently, by color matrix processing to digital pixel signals of respective colors (RGB) of respective pixels, the characteristics of the digital pixel signals of the colors R, G and B output from the CCD image sensor are matched with sensitivity characteristics to the colors R, G and B of human eyes so that a natural color image will be displayed (step S5).

Further, processing for adjusting contrast and processing for gamma control are performed on the digital pixel signals of the colors R, G and B, on which color matrix processing has been performed, to generate digital image signals (step S6).

It is noted that the signal processing shown in FIG. 11 is basic processing in a signal processing apparatus. Without limitation to these types of processing, it is desirable to perform other processing as appropriate that is not described herein, including various corrections such as noise, white defect, vertical line and horizontal line corrections, as well as shading correction. It is normally desirable to perform such processing prior to interpolation processing. While these corrections are more effective when performed prior to interpolation processing, it is also possible to perform it after interpolation processing. In addition, the order of the various types of processing is not limited to the order shown in FIG. 11.

As described above, solid-state imaging apparatuses include, not only a CCD solid-state imaging apparatuses, but also CMOS solid-state imaging apparatuses.

FIG. 12 is a diagram for describing a conventional CMOS solid-state imaging apparatus.

Output signals of such a CMOS solid-state imaging apparatus are also processed by a signal processing apparatus as described above to obtain digital image signals.

A CMOS image sensor 10 comprises a pixel section 11 composed of pixels arranged in a matrix, a vertical selection circuit (V selection circuit) 12 for selecting pixels of the pixel section 11 in row units, and a signal processing circuit (S/H, CDS circuit) 13 for performing noise rejection processing on analog pixel signals of pixels in a pixel row selected by the vertical selection circuit 12 and retaining the signals. The signal processing circuit 13 performs processing for rejecting a fixed pattern noise for each pixel, on analog pixel signals from the pixels of each selected row.

The CMOS image sensor 10 also comprises: a horizontal selection circuit (H selection circuit) 14 for successively taking out and outputting analog pixel signals retained in the signal processing circuit 13; an AGC circuit 16 for amplifying the analog pixel signals output from the signal processing circuit 13 at an appropriate gain; an A/D converter 17 for converting the analog pixel signals amplified by the AGC circuit 16 into digital pixel signals; a digital amplifier 18 for amplifying and outputting the digital pixel signals; and a timing generating section (TG) 15 for generating a timing signal for controlling the respective circuits described above.

The CMOS image sensor 10 further comprises a signal processing apparatus 19 for performing signal processing on the digital pixel signals output from the digital amplifier 18, and the signal processing apparatus 19 has the same configuration as the signal processing apparatus 200 shown in FIG. 10(a), except for the A/D converter.

The manufacturing process for such a CMOS image sensor 10 is based on a standard process of CMOS LSI, and thus, circuits (a timing generating section 15, an AGC circuit 16, an A/D converter 17, a digital amplifier 18, and a signal processing apparatus 19) for achieving functions, other than those (a pixel section 11, a V selection circuit 12, a H selection circuit 14, and a signal processing circuit 13) functioning as a CMOS image sensor, can also be incorporated on the same chip.

Hereinafter, the afore-mentioned interpolation processing will be described in detail.

As described above, pixels, each having a color filter of red, green or blue, are arranged in a checkered pattern in a solid-state imaging apparatus of this type. In addition, there exists a solid-state imaging apparatus, in which an arrangement of such color filters is made with four adjacent color filters of red, green and blue as a unit, which are rotated by 45 degrees to form a honey-comb shape. In any filter arrangements, each pixel has only an element of one of red, green and blue colors, and it is necessary to obtain elements of the other colors by an interpolation from the surrounding pixels. The most known interpolation is a linear interpolation.

FIG. 13 is a diagram for describing a method for a linear interpolation, in which the arrangement of the pixels P in the pixel section 1a shown in FIG. 10(b) are separately shown in FIGS. 13(a), 13(b) and 13(c) with different colors, such as red, green and blue, respectively.

In these figures, each square represents a pixel, and R, G or B in each square indicates the color of a color filter provided in the pixel. On the contrary, the squares without an indication of R, G or B are pixels that need to generate color by an interpolation, and the coordinates of the pixels are shown in parentheses.

Herein, the coordinates of the pixel to be interpolated (target pixel) are x, y. For better understanding, the squares indicating pixels for the subject of the interpolation are represented by slanted line areas, while the squares indicating pixels to be used for the interpolation are represented by dotted areas. It is noted that (x, y)=(0, 0) is a reference point of the arrangement of pixels of respective colors shown in FIGS. 13(a), 13(b) and 13(c).

FIG. 13(a) is a diagram for describing interpolation processing of pixel signals of a R pixel.

First, when a R pixel value (a digital pixel signal of a red color) of a pixel P22 in between adjacent R pixels arranged in a horizontal direction is obtained by an interpolation, the R pixel value is obtained by the formula (1a) shown in FIG.

13(a). Herein, R(x, y) in the formula (1a) is a R pixel value of the target pixel P22 to be interpolated.

Further, when a R pixel value of a pixel P73 in between adjacent R pixels arranged in a vertical direction is obtained by an interpolation, the R pixel value is obtained by the formula (1b) shown in FIG. 13(a). Herein, R(x, y) in the formula (1b) is a R pixel value of the target pixel P73 to be interpolated.

Further, when a R pixel value of a pixel P163, positioned at the center of a square with four adjacent R pixels positioned at the respective apexes of the square, is obtained using the four R pixels by an interpolation, the R pixel value is obtained by the formula (1c) shown in FIG. 13(a). Herein, R(x, y) in the formula (1c) is a R pixel value of the target pixel P163 to be interpolated.

FIG. 13(b) is a diagram for describing interpolation processing of pixel signals of a G pixel.

When a G pixel value (a digital pixel signal of a green color) of a pixel P63, positioned at the center of a rhombus formed by rotating a square by 45 degrees, is obtained by an interpolation, using four adjacent G pixels positioned at the respective apexes of the rhombus, the G pixel value is obtained by a formula (2) shown in FIG. 13(b). Herein, G(x, y) in the formula (2) is a G pixel value of the target pixel P63 for the interpolation.

FIG. 13(c) shows interpolation processing of a pixel signal of a B pixel.

First, when a B pixel value of a pixel P33 in between adjacent B pixels arranged in a horizontal direction is obtained by an interpolation, the B pixel value is obtained by a formula (3a) shown in FIG. 13(c). Herein, B(x, y) in the formula (3a) is a B pixel value of the target pixel P33 for the interpolation.

Further, when a B pixel value of a pixel P84 in between adjacent B pixels arranged in a vertical direction is obtained by an interpolation, the B pixel value is obtained by a formula (3b) shown in FIG. 13(c). Herein, B(x, y) in the formula (3b) is a B pixel value of the target pixel P84 for the interpolation.

Further, when a B pixel value of a pixel P174, positioned at the center of a square is obtained by an interpolation, using four adjacent B pixels positioned at the respective apexes of the square, the B pixel value is obtained by the formula (3c) shown in FIG. 13(c). Herein, B(x, y) in the formula (3c) is a B pixel value of the target pixel P174 to be interpolated.

Such a linear interpolation as described above represents interpolations for averaging pixel values, and such interpolations for averaging mean an interpolation for mixing and adding pixel values of surrounding pixels around the target pixel, where the sum of coefficients will normally be 1. It is noted that there are an infinite number of methods for interpolations, and the methods described herein are mere examples for understanding prior art of the present invention. Thus, the interpolation methods are not limited to those described above.

Since the linear interpolation is an interpolation for averaging as in the examples described above, it causes the edge boundary to be ambiguous and resolution to be decreased.

Thus, it is often practiced to avoid performing only the averaging of pixel values during an interpolation, but edge emphasis is performed simultaneously to improve resolution.

FIG. 14 is a diagram for describing interpolation processing of a R pixel value on which edge emphasis is performed, in which the arrangement of pixels P in the pixel section 1a shown in FIG. 10(b) are separately shown in FIGS. 14(a), 14(b) and 14(c) with different colors, such as red, green and blue, respectively. In these figures, as similar to FIG. 13, the coordinates of a pixel to be interpolated (target pixel) are x, y.

For better understanding, the squares indicating pixels for the subject of the interpolation are represented by slanted line areas, while the squares indicating pixels to be used for the interpolation are represented by dotted areas.

First, when a R pixel value of a pixel P22 in between adjacent R pixels arranged in a horizontal direction is obtained by an interpolation, the R pixel value is obtained by the formula (4a) shown in FIG. 14(a). Herein, R(x, y) in the formula (4a) is a R pixel value of the target pixel P22 to be interpolated.

Further, when a R pixel value of a pixel P163, positioned at the center of a square is obtained by an interpolation, using four adjacent R pixels positioned at the respective apexes of the square, the R pixel value is obtained by the formula (4b) shown in FIG. 14(a). Herein, R(x, y) in the formula (4b) is a R pixel value of the target pixel P163 to be interpolated.

Herein, the pixel value of G pixels is used for edge emphasis at the position above, below, to the left and to the right of the target pixel.

Further, when a R pixel value of a pixel P243, positioned at the center of a square is obtained by an interpolation, using four adjacent R pixels positioned at the respective apexes of the square, the R pixel value is obtained by the formula (4c) shown in FIG. 14(a). Herein, R(x, y) in the formula (4c) is a R pixel value of the target pixel P243 to be interpolated.

Herein, the pixel value of B pixels is used for edge emphasis at the position above, below, to the left and to the right of the pixel.

FIG. 15 is a diagram for describing interpolation processing of a G pixel value for edge emphasis, in which the arrangement of pixels P in the pixel section 1a shown in FIG. 10(b) are separately shown in FIGS. 15(a), 15(b) and 15(c) with different colors, such as red, green and blue, respectively. In these figures, as similar to FIG. 13, the coordinates of a pixel to be interpolated (target pixel) is x, y. For better understanding, the squares indicating pixels for the subject of the interpolation are represented by slanted line areas, while the squares indicating pixels to be used for the interpolation are represented by dotted areas.

First, when a G pixel value of a pixel P72, positioned at the center of a rhombus formed by rotating a square by 45 degrees, is obtained by an interpolation, using four adjacent G pixels positioned at the respective apexes of the rhombus, the G pixel value is obtained by a formula (5a) shown in FIG. 15(b). Herein, G(x, y) in the formula (5a) is a G pixel value of the target pixel P72 for the interpolation. Further, the pixel value of R pixels is used for edge emphasis.

Further, when a G pixel value of a pixel P203, positioned at the center of a rhombus formed by rotating a square by 45 degrees, is obtained by an interpolation using four adjacent G pixels positioned at the respective apexes of the rhombus, the G pixel value is obtained by a formula (5b) shown in FIG. 15(b). Herein, G(x, y) in the formula (5b) is a G pixel value of the target pixel P203 for the interpolation. Further, the pixel value of B pixels is used for edge emphasis.

FIG. 16 is a diagram for describing an example of an interpolation with edge emphasis using pixels of the same color, in which the arrangement of G pixels in the pixel section 1a shown in FIG. 10(b) are shown. In the figure, as similar to FIG. 13, the coordinates of a pixel to be interpolated (target pixel) are x, y. For better understanding, the squares indicating pixels for the subject of the interpolation are represented by slanted line areas, while the squares indicating pixels to be used for the interpolation are represented by dotted areas.

When a G pixel value of a pixel P163, surrounded by G pixels on the top, bottom, left and right, is obtained by interpolation with edge emphasis, the G pixel value is obtained by a formula (6) shown in FIG. 16. Herein, G(x, y) in the formula (6) is a G pixel value of the interpolated pixel P163. Further, the pixel values of twelve G pixels positioned in the periphery of the interpolated pixel are used for edge emphasis.

As exemplified above, a formula in which averaging of pixel values of surrounding pixels and differences of pixel values of surrounding pixels are combined is used as one of the interpolation methods with edge emphasis. The sum of coefficients will be normally 1. Furthermore, the edge will be clearer as the coefficient of subtraction becomes larger. In addition, although pixels of the same color only may be used, the edge will be effectively clear by using pixels of different colors in the periphery for the interpolation.

Also, such a method is known that detects a gradient of pixel values in a pixel section to perform interpolation using the pixel value of pixels arranged in a direction with a gentle gradient.

FIG. 17 is a diagram for describing interpolation processing that is in consideration of such a pixel value gradient, where the arrangement of pixels P in the pixel section 1*a* shown in FIG. 10(*b*) are separately indicated with the colors, red, green and blue, in FIGS. 17(*a*), 17(*b*) and 17(*c*), respectively. In these figures, as similar to FIG. 13, the coordinates of a pixel to be interpolated (target pixel) are x, y. For better understanding, the squares indicating pixels for the subject of the interpolation are represented by slanted line areas, while the squares indicating pixels to be used for the interpolation are represented by dotted areas.

When a G pixel value of a pixel P72, positioned at the center of a rhombus formed by rotating a square by 45 degrees, is obtained by an interpolation, using four adjacent G pixels positioned at the respective apexes of the rhombus, a gradient β of a pixel value in a horizontal arrangement of pixels including the pixel P72 is first obtained by a formula (7b) using a R pixel value, and a gradient α of a pixel value in a vertical arrangement of pixels including the pixel P72 is obtained by a formula (7a) using a R pixel value.

It is noted that the gradient β of a pixel value in a horizontal arrangement of pixels including the pixel P72 may also be obtained by a conditional formula (8b) using a G pixel value and the gradient α of a pixel value in a vertical arrangement of pixels including the pixel P72 may also be obtained by a conditional formula (8a) using a G pixel value.

Subsequently, based on the size relationship between the gradient β of a pixel value in a horizontal arrangement and the gradient α of a pixel value in a vertical arrangement, and based on formulas (9a) to (9c), the G pixel value of the target pixel P72 is obtained.

Specifically, when a gradient α of a pixel value in a vertical arrangement is smaller than a gradient β of a pixel value in a horizontal arrangement, the G pixel value of the target pixel P72 is obtained by the formula (9a); and when a gradient β of a pixel value in a horizontal arrangement is smaller than a gradient α of a pixel value in a vertical arrangement, the G pixel value of the target pixel P72 is obtained by the formula (9b). Further, when a gradient α of a pixel value in a vertical arrangement is equal to a gradient β of a pixel value in a horizontal arrangement, the G pixel value of the target pixel P72 is obtained by the formula (9c). Thereby, interpolation can be performed using a pixel value of pixels arranged in a direction with a gentle gradient.

As such, the method described above is such that an edge is maintained by averaging pixels in a direction with a gentle change in pixel values. Herein, two formulas for determining conditions are exemplified for only the interpolation processing for obtaining a G pixel value of a R pixel as a target pixel.

In addition, while the pixels for the averaging are limited in this method, the total sum of the coefficients will also normally be 1.

For the interpolation with edge emphasis, while there are various methods, such as a method in which differences are combined and a method using a gradient, the methods are not limited to these.

Furthermore, there is also such a method in which interpolation using a G pixel value are performed and then a R pixel value and a B pixel value are interpolated using the G pixel value calculated by the interpolation.

Furthermore, even for pixel values that do not require interpolation, such as, for example, a G pixel value of a G pixel with a green color filter, it is possible to suppress noise by performing interpolation processing using pixel values of surrounding pixels.

FIG. 18 is a diagram for describing an example of an interpolation using a pixel value of surrounding pixels of the same color, where the arrangement of pixels P in the pixel section 1*a* shown in FIG. 10(*b*) are separately indicated with the colors, red, green and blue, in FIGS. 18(*a*), 18(*b*) and 18(*a*), respectively. In these figures, as similar to FIG. 13, the coordinates of a pixel to be interpolated (subject interpolation pixel) are x, y. For better understanding, the squares indicating pixels for the subject of the interpolation are represented by slanted line areas, while the squares indicating pixels to be used for the interpolation are represented by dotted areas.

First, when a R pixel value of a pixel P33, positioned at the center of a rhombus formed by rotating a square by 45 degrees, is obtained by an interpolation, using four adjacent R pixels positioned at the respective apexes of the rhombus, the R pixel value is obtained by a formula (10a) shown in FIG. 18(*a*). Herein, R (x, y) in the formula (10a) is the R pixel value of the subject interpolation pixel P33.

Further, when a G pixel value of a pixel P53, positioned at the center of a square is obtained by an interpolation, using four adjacent G pixels positioned at the respective apexes of the square, the G pixel value is obtained by a formula (10b) shown in FIG. 18(*b*). Herein, G(x, y) in the formula (10b) is a G pixel value of the target pixel P53 to be interpolated.

Further, when a G pixel value of a pixel P113 is interpolated using a pixel value of eight G pixels positioned adjacent to the pixel P113, the G pixel value is obtained by a formula (10c) shown in FIG. 18(*b*). Herein, G(x, y) in the formula (10c) is a G pixel value of the target pixel P113 for the interpolation.

When a B pixel value of a pixel P43, positioned at the center of a rhombus formed by rotating a square by 45 degrees, is obtained by an interpolation, using four adjacent B pixels positioned at the respective apexes of the rhombus, the B pixel value is obtained by a formula (10d) shown in FIG. 18(*c*). Herein, B(x, y) in the formula (10d) is a B pixel value of the target pixel P43 for the interpolation.

In FIG. 18, two examples are exemplified for the interpolation of a G pixel value of G pixels, and the total sum of the coefficients in this case will also normally be 1.

As described above, while there are various methods for the interpolation, noise can be reduced by adding and averaging surrounding pixels during the interpolation. Noise can be further reduced as the number of pixels to be averaged is increased.

On the other hand, when a modulus of pixels to be averaged is reduced by calculating a gradient, or the like, resolution will be increased while the effect of suppressing noise is reduced. Alternatively, when the subtraction among surrounding pixels are performed and the edge is emphasized during an interpolation, noise and the edge will be both amplified.

When a subject to be captured (subject) is dark or a black subject is captured, the level of output signals of the solid-state imaging apparatus is reduced, resulting in relatively obvious noise. This is because the human vision is originally sensitive to the difference in brightness, and in addition, because the human vision dose not react to the light amount linearly but the gradation in the dark is clearer to the human vision. On the contrary, as the subject becomes lighter, it will be difficult to distinguish the gradation and noise will be less obvious. Furthermore, when a subject to be captured is bright, noise that is more than the noise in the dark will be output due to light shot noise. However, it is rare for such a case to be problematic since the ratio of signals and noise will be decreased.

In addition, the human vision has high visual attraction towards a part with high brightness and saturation, and such a part is easily memorized. In addition, as the difference in brightness is increased in a contrast hue, the visibility will be increased, and such an image will be easy to see for humans. Thus, the resolution of an area with high brightness and saturation is particularly necessary.

On the other hand, visual attraction will be low towards a part with low brightness and saturation, and such a part is difficult to be memorized. However, when a part that was not originally obvious becomes obvious due to noise, the part will be recognized as an eyesore.

Patent Literature 1 discloses a way of appropriately adding an interpolation image with poor resolution and an interpolation image with original resolution, as interpolation processing.

CITATION LIST

Patent Literature

[PTL 1] Japanese Laid-Open Publication No. 2005-328215

DISCLOSURE OF THE INVENTION

Technical Problem

While the conventional image processing methods include that for changing interpolation processing based on spacial frequency and edge information, such a method is problematic in such a manner that edge emphasis is evenly performed on an entire screen, resulting in unnecessary emphasis on an edge of a dark part or a part with low visual attraction due to low saturation, or in such a manner that processing for emphasizing even a finite edge, if found, is performed in an overall dark image, resulting in amplifying noise.

Although a way of appropriately adding an interpolation image with poor resolution and an interpolation image with original resolution is disclosed as in Patent Literature 1 for example, this is for correcting the difference in sensitivities, which is not capable of adjusting edge intensity by interpolation processing based on the brightness or the like in individual areas of a screen.

The present invention is intended to solve the conventional problems described above. It is an objective of the present invention to provide a signal processing apparatus and a signal processing method, capable of reducing noise and improving S/N by interpolation in an area with low brightness or saturation on a display screen and increasing resolution by edge emphasis in an area with high brightness or saturation on the display screen a solid-state imaging apparatus including the signal processing apparatus; an electronic information device comprising the solid-state imaging apparatus; an image processing program for allowing a computer to execute the signal processing method; and a computer readable storage medium for recording the signal processing program.

Solution to Problem

A signal processing apparatus according to the present invention is provided for performing signal processing on pixel signals output from an imaging element, the imaging element having a plurality of pixels for photoelectrically converting light from a subject, the pixel signal corresponding to respective pixels, the signal processing apparatus comprising: a determination section for determining brightness or saturation at one or a plurality of pixels for each pixel; and an interpolation processing section for performing interpolation processing of interpolating a pixel signal of a target pixel using pixel signals of peripheral pixels positioned in the periphery of the target pixel based on the determined brightness or saturation of the pixel, where the interpolation processing section performs adaptive interpolation processing of selecting, for each pixel, interpolation processing suitable for the determined brightness or saturation of the target pixel, from among at least two or more types of interpolation processing, and interpolating a pixel signal of the target pixel by the selected interpolation processing, thereby achieving the objective described above.

Preferably, in a signal processing apparatus according to the present invention, when the determined brightness of the target pixel is smaller than a predetermined threshold value, the interpolation processing section selects interpolation processing of mixing the pixel signals of the peripheral pixels.

Still preferably, in a signal processing apparatus according to the present invention, when the determined brightness of the target pixel is greater than a predetermined threshold value, the interpolation processing section selects interpolation processing involving edge emphasis of the target pixel using a difference of the pixel signals of the peripheral pixels.

Still preferably, in a signal processing apparatus according to the present invention, when the determined brightness of the target pixel is greater than a predetermined threshold value, the interpolation processing section selects interpolation processing of obtaining a gradient of the pixel signals of the peripheral pixels, selecting specific peripheral pixels from the plurality of peripheral pixels based on the gradient, and mixing pixel signals of the selected specific peripheral pixels.

Still preferably, in a signal processing apparatus according to the present invention, when the determined saturation of the target pixel is smaller than a predetermined threshold value, the interpolation processing section selects interpolation processing of mixing the pixel signals of the peripheral pixels.

Still preferably, in a signal processing apparatus according to the present invention, when the determined saturation of the target pixel is greater than a predetermined threshold value, the interpolation processing section selects interpolation processing involving edge emphasis of the target pixel using a difference of the pixel signals of the peripheral pixels.

Still preferably, in a signal processing apparatus according to the present invention, when the determined saturation of the target pixel is greater than a predetermined threshold value, the interpolation processing section selects interpolation processing of obtaining a gradient of the pixel signals of the peripheral pixels, selecting specific peripheral pixels from the plurality of peripheral pixels based on the gradient, and mixing pixel signals of the selected specific peripheral pixels.

Still preferably, in a signal processing apparatus according to the present invention, when edge emphasis is performed using a difference of the pixel signals of the peripheral pixels, the interpolation processing section selects interpolation processing of interpolating the pixel signal of the target pixel using the pixel signals of the peripheral pixels of colors different from the color of the pixel signal to be interpolated as the pixel signal of the target pixel.

Still preferably, in a signal processing apparatus according to the present invention, when the interpolation processing section performs interpolation processing of the target pixel by obtaining a gradient of the pixel signals in an area where the peripheral pixels are arranged, selecting specific peripheral pixels from the plurality of peripheral pixels based on the gradient, and mixing pixel signals of the selected specific peripheral pixels, the gradient is obtained by using the pixel signals of the peripheral pixels of colors different from the color of the pixel signal to be interpolated.

Still preferably, in a signal processing apparatus according to the present invention, the determining section uses, for determining brightness or saturation of the target pixel, pixel signals of a plurality of pixels, including pixels of different colors, in an area including the peripheral pixels used to interpolate the pixel signal of the target pixel.

Still preferably, in a signal processing apparatus according to the present invention, the determining section determines brightness of the target pixel, using a highest brightness among the brightnesses of the respective pixels obtained from the pixels in an area including the peripheral pixels used for the interpolation processing.

Still preferably, in a signal processing apparatus according to the present invention, the determining section determines brightness of the target pixel from a pixel signal of a green color pixel among the peripheral pixels.

Still preferably, in a signal processing apparatus according to the present invention, for brightness of the target pixel, the determining section uses a luminance signal obtained from pixel signals of pixels in an area including the peripheral pixels used for interpolation processing of the target pixel.

Still preferably, in a signal processing apparatus according to the present invention, the determining section obtains saturation of the target pixel from a difference of pixel signals of green and red, and a difference of pixel signals of green and blue, from among the pixel signals of the peripheral pixels used for interpolation processing of the target pixel.

Still preferably, in a signal processing apparatus according to the present invention, the signal processing apparatus further comprises a noise rejection section for performing noise rejection processing on the pixel signals corresponding to the respective pixels output from the imaging element; and the determining section calculates brightness or saturation of the target pixel based on the pixel signal that has been subjected to the noise rejection processing.

Still preferably, in a signal processing apparatus according to the present invention, the determining section is configured to determine brightness or saturation of the pixels for each pixel based on the pixel signals corresponding to the respective pixels while performing noise rejection processing on the pixel signals corresponding to the respective pixels output from the imaging element.

Still preferably, in a signal processing apparatus according to the present invention, the signal processing apparatus further comprises a noise rejection section for performing noise rejection processing on the pixel signals corresponding to the respective pixels output from the imaging element; and the interpolation processing section performs the adaptive interpolation processing using the pixel signals that have been subjected to the noise rejection processing.

Still preferably, in a signal processing apparatus according to the present invention, the interpolation processing section is configured to perform the adaptive interpolation processing while performing noise rejection processing on the pixel signals corresponding to the respective pixels output from the imaging element.

Still preferably, in a signal processing apparatus according to the present invention, the two or more types of interpolation processing are interpolation processing using identical peripheral pixels, the interpolation processing preparing two or more different coefficients for a formula for obtaining the pixel signal of the target pixel from pixel signals of the identical peripheral pixels, and the interpolation processing determining which of the two or more of different coefficients to use based on brightness or saturation of the target pixel.

Still preferably, in a signal processing apparatus according to the present invention, the two or more types of interpolation processing are for interpolating the pixel signal of the target pixel by using a pixel signal obtained by multiplying the pixel signals of the peripheral pixels by different coefficients; and for the coefficients in each type of the interpolation processing, coefficients obtained through continuous change based on the determined brightness or saturation of the target pixel are used.

Still preferably, in a signal processing apparatus according to the present invention, for the coefficients in each of the two or more types of the interpolation processing, coefficients obtained through continuous change based on a linear function based on the determined brightness or saturation of the target pixel are used.

Still preferably, in a signal processing apparatus according to the present invention, for the coefficients in each of the two or more types of the interpolation processing, coefficients obtained through continuous change based on a logarithmic function based on the determined brightness or saturation of the target pixel are used.

Still preferably, in a signal processing apparatus according to the present invention, the two or more types of interpolation processing are for interpolating the pixel signal of the target pixel using a total sum of pixel signals obtained by multiplying a pixel signal of each of the plurality of peripheral pixels by coefficients; and the total sum of the coefficients, by which the pixel signal of each of the plurality of peripheral pixels are multiplied, is 1.

Still preferably, in a signal processing apparatus according to the present invention, the interpolation processing section is configured to restrict the adaptive interpolation processing based on a subject as a light source.

Still preferably, in a signal processing apparatus according to the present invention, the interpolation processing section is configured to restrict the adaptive interpolation processing if a gain in the imaging element during image-capturing is at or less than a fixed magnification.

Still preferably, in a signal processing apparatus according to the present invention, the interpolation processing section is configured to restrict the adaptive interpolation processing if the amount of light that the imaging element receives during image-capturing is at or more than a fixed amount of light.

Still preferably, in a signal processing apparatus according to the present invention, the interpolation processing section is configured to restrict the adaptive interpolation processing based on a light gathering state of an optical system for guiding light from the subject to the imaging element during image-capturing.

Still preferably, in a signal processing apparatus according to the present invention, the interpolation processing section is configured to restrict the adaptive interpolation processing based on the degree of an aperture of the optical system during image-capturing.

Still preferably, in a signal processing apparatus according to the present invention, the interpolation processing section is configured to restrict the adaptive interpolation processing based on a focal distance of the optical system during image-capturing.

Still preferably, in a signal processing apparatus according to the present invention, the interpolation processing section is configured to restrict the adaptive interpolation processing based on a shutter speed of the imaging element during image-capturing.

Still preferably, in a signal processing apparatus according to the present invention, the interpolation processing section is configured to restrict the adaptive interpolation processing if it is determined that an image of a main subject is being captured against the light.

A signal processing method according to the present invention is provided for performing signal processing on pixel signals output from an imaging element, the imaging element having a plurality of pixels for photoelectrically converting light from a subject, the pixel signals corresponding to respective pixels, the signal processing method comprising: a step of determining brightness or saturation at one or a plurality of pixels for each pixel; and a step of performing interpolation processing of interpolating a pixel signal of a target pixel using pixel signals of peripheral pixels positioned in the periphery of the target pixel based on the determined brightness or saturation of the pixel, where the step of performing interpolation processing performs adaptive interpolation processing of selecting, for each pixel, interpolation processing suitable for the determined brightness or saturation of the target pixel, from among at least two or more types of interpolation processing, and interpolating a pixel signal of the target pixel by the selected interpolation processing, thereby achieving the objective described above.

A solid-state imaging apparatus according to the present invention comprises: an imaging element having a plurality of pixels for photoelectrically converting light from a subject; and a signal processing apparatus for performing signal processing on pixel signals corresponding to respective pixels output from the imaging element, where the signal processing apparatus is the signal processing apparatus according to the present invention, thereby achieving the objective described above.

An electronic information device according to the present invention comprises an imaging section for capturing an image of a subject, where the imaging section is the solid-state imaging apparatus according to the present invention, thereby achieving the objective described above.

A signal processing program according to the present invention is provided for allowing a computer to perform signal processing on pixel signals output from an imaging element having a plurality of pixels for photoelectrically converting light from a subject, the pixel signals corresponding to respective pixels, the signal processing program allowing the computer to perform: a step of determining brightness or saturation at one or a plurality of pixels for each pixel; and a step of performing interpolation processing to calculate a pixel signal of a target pixel from pixel signals of peripheral pixels positioned in the periphery of the target pixel based on the determined brightness or saturation of the pixel, where the step of performing interpolation processing allows the computer to perform adaptive interpolation processing of switching the types of interpolation processing among at least two or more types of interpolation processing, to the interpolation processing suitable to the determined brightness or saturation of the target pixel, thereby achieving the objective described above.

A computer readable storage medium according to the present invention is provided for recording the signal processing program according to the present invention, thereby achieving the objective described above.

Next, the operation of the present invention will be described.

According to the present invention, a signal processing apparatus for processing pixel signals corresponding to a plurality of pixels respectively, determines brightness and saturation of the pixels and adaptively performs interpolation processing to the pixel signals by using two or more types of interpolation processing based on the brightness and saturation of the determined pixels. Thus, it becomes possible to reduce noise and improve S/N by interpolation in an area with low brightness or saturation on a display screen and increase resolution by edge emphasis in an area with high brightness or saturation on the display screen.

According to the present invention, when the determined brightness of a target pixel is lower than a predetermined threshold value, interpolation processing for mixing pixel signals of said surrounding pixels will be selected. Thus, it becomes possible to reduce the influence by noise in a pixel with low brightness, in which noise is easy to be obvious. Alternatively, in a pixel with low saturation, it becomes possible to beautifully display colors, such as white, black and gray, by averaging.

According to the present invention, when the determined brightness of a target pixel is higher than a predetermined threshold value, interpolation processing involving edge emphasis of the target pixel using a difference of pixel signals of the surrounding pixels will be selected. Thus, it becomes possible to obtain a clear image by enhancing a boundary with respect to a pixel with high brightness.

According to the present invention, when the determined brightness of a target pixel is higher than a predetermined threshold value, interpolation processing for obtaining a gradient of pixel signals of the surrounding pixels, selecting a specific surrounding pixel from the plurality of surrounding pixels based on the gradient, and mixing pixel signals of the selected specific surrounding pixel will be selected. Thus, in an pixel with high brightness, surrounding pixels are also used to obtain a gradient to narrow down pixels to be mixed, so that interpolation with edge emphasis can be performed. In addition, since a pixel with high saturation has high visual attraction, it is effective to perform interpolation with edge emphasis.

According to the present invention, resolution can be increased by performing interpolation to emphasize an edge in the colors other than the color of pixels to be interpolated, and in particular, to emphasize an edge using G pixels, which are arranged twice as many as R pixels and B pixels.

According to the present invention, when an output signal of a pixel having a color filter that is of the same color as the color to be interpolated is used, it becomes possible to prevent a false color from being generated.

According to the present invention, by obtaining brightness or saturation of a target pixel by using pixels in a pixel area used for an interpolation (i.e., surrounding pixels used for the interpolation of a target pixel) and surrounding pixels, which are positioned in the periphery of the target pixel and which are not used for the interpolation, it becomes possible to determine the brightness or saturation of a target pixel in consideration of surrounding pixels adjacent to the target pixel, which is the subject of the interpolation. Furthermore, by determining the type of interpolation processing based on the brightness or saturation of the thus obtained target pixel, it becomes possible to determine interpolation processing as appropriate even if there is an edge near the target pixel.

According to the present invention, appropriate interpolation processing can be determined by using the brightest part in an area to be interpolated for the determination of the brightness or saturation of a pixel. Moreover, since the green color is most important for wavelengths for allowing brightness to be visually sensed, it is effective to perform a determination for the interpolation based on pixel signals of green pixels.

According to the present invention, quantification of saturation can be readily performed by obtaining the saturation of a target pixel from a difference of pixel signals of green and red, and a difference of pixel signals of green and blue, from among pixel signals of peripheral pixels used for the interpolation processing of the target pixel.

According to the present invention, a noise rejection section is comprised for performing noise rejection processing on pixel signals corresponding to respective pixels output from an imaging element, and the determining section calculates brightness or saturation of the target pixel based on the pixel signal that has been subjected to the noise rejection processing, thereby accurately obtaining the brightness or saturation of the target pixel.

Furthermore, noise processing is performed for removing pixel signals sufficiently away from an average value or intermediate value of pixel signals of peripheral pixels, or a location where noise will occur is recorded in advance to perform noise processing on a pixel signal of the pixel at the location, so that noise rejection can be performed during the determination on brightness or saturation, or during interpolation processing.

According to the present invention, two or more types of interpolation processing are for interpolating a pixel signal of a target pixel using pixel signals obtained by multiplying pixel signals of peripheral pixels by different coefficients. In each type of the interpolation processing, as the coefficients, coefficients obtained through continuous change based on the determined brightness or saturation of the target pixel are used, so that the types of interpolation processing can be switched more appropriately.

According to the present invention, the sum of the coefficients described above is defined to be 1, so that color tone will be difficult to change and a natural coloration can be easily obtained.

According to the present invention, the adaptive interpolation processing is restricted based-on a light source, or based on information of the amount of light in the periphery of a light-receiving section. Thus, the restriction is effective when the adaptive interpolation processing is not necessary, such as when a background sky or a forest is brighter than a subject during image-capturing against the light in the outside during a day time, or when the sky is brighter than a subject with the setting sun, or when it is brighter outside the window than in a room during an image-capturing.

In addition, since resolution will be decreased when it is cloudy or rainy, adjustments, such as reducing the number of pixels used for interpolation or lowering a threshold value for edge emphasis, in the interpolation processing for averaging pixels used in the adaptive interpolation processing will be effective.

According to the present invention, the adaptive interpolation processing will be restricted if a gain in the imaging element during image-capturing is at or less than a certain fixed magnification. Thus, the restriction is effective in a case when noise does not become problematic unless the gain reaches a certain value. In such a case, it is desirable to determine whether or not to perform the adaptive interpolation processing based on the level of the gain.

According to the present invention, the adaptive interpolation processing will be restricted if the amount of light that the imaging element receives during image-capturing is at or more than a certain amount of light. Thus, for example, it will not be necessary to perform a separate interpolation for averaging when it is so bright and saturation is so high that the adaptive interpolation processing is not necessary. In this case, the restriction of the interpolation processing will be effective.

According to the present invention, if a shutter speed of the imaging element is extremely short, the adaptive interpolation processing will be restricted and averaging of pixels will be performed in interpolation processing, thereby reducing noise in a dark part.

According to the present invention, the adaptive interpolation processing will be restricted based on a converging state of an optical system for guiding light from the subject to the imaging element during image-capturing. Thus, the restriction will be effective when it is an extremely delicate issue which edge will be emphasized or shaded off when the aperture is closer to its widest state.

For example, it is desirable to determine whether or not to perform the adaptive interpolation processing based on the setting of an optical system (converging state). The setting of a lens includes a value for an aperture and a focal distance. Also, when a wide-angle lens is used with the aperture closer to its narrowest, edge emphasis may be performed more since pan focus is expected. On the other hand, since an area with a long focal distance tends to be blurred and it is difficult for the overall screen to be blurred in an area with a short focal distance, it is effective to adjust the degree of edge emphasis in the adaptive interpolation processing based on the focal distance.

Advantageous Effects of Invention

According to the present invention as described above, it becomes possible to attain a signal processing apparatus and a signal processing method, capable of reducing noise and improving S/N by interpolation in a pixel with low brightness or saturation while increasing resolution by edge emphasis in a pixel with high brightness or saturation; a solid-state imaging apparatus including the signal processing apparatus; an electronic information device comprising the solid-state imaging apparatus; an image processing program for allowing a computer to execute the signal processing method; and a computer readable storage medium for recording the signal processing program.

BRIEF DESCRIPTION OF THE DRAWINGS

FIG. 1 is a diagram for describing a solid-state imaging apparatus according to Embodiment 1 of the present invention, where FIG. 1(a) schematically shows an overall configuration of a camera system comprising the solid-state imaging apparatus and FIG. 1(b) shows a configuration of a signal processing apparatus constituting the solid-state imaging apparatus.

FIG. 4 is a diagram for describing an operation of a signal processing apparatus in a solid-state imaging apparatus according to Embodiment 1 of the present invention, showing an example of changing edge emphasis of a R pixel signal using a function.

FIG. 5 is a diagram for describing a solid-state imaging apparatus according to Embodiment 2 of the present invention, where FIG. 5(a) schematically shows an overall configuration of a camera system including the solid-state imaging apparatus and FIG. 5(b) shows a configuration of a signal processing apparatus constituting the solid-state imaging apparatus.

FIG. 6 is a diagram for describing a solid-state imaging apparatus according to Embodiment 3 of the present invention, where FIG. 6(a) schematically shows an overall configuration of a camera system including the solid-state imaging apparatus and FIG. 6(b) shows a configuration of a signal processing apparatus constituting the solid-state imaging apparatus.

FIG. 7 is a diagram for describing a solid-state imaging apparatus according to Embodiment 4 of the present invention, where FIG. 7(a) schematically shows an overall configuration of a camera system including the solid-state imaging apparatus and FIG. 7(b) shows a configuration of a signal processing apparatus constituting the solid-state imaging apparatus.

FIG. 10(b) shows a configuration of a CCD image sensor constituting the solid-state imaging apparatus, and FIG. 10(c) shows an arrangement of color filters in the solid-state imaging apparatus.

FIG. 13(a) shows interpolation processing of a pixel signal of a R pixel, FIG. 13(b) shows interpolation processing of a pixel signal of a G pixel, and FIG. 13(c) shows interpolation processing of a pixel signal of a B pixel.

FIG. 18 is a diagram for describing an example of interpolating a pixel value of a pixel to be interpolated using a pixel value of peripheral pixels of the same color, where the arrangement of pixels in the pixel section shown in FIG. 10(b) are separately indicated with the colors, red, green and blue, in FIGS. 18(a), 18(b) and 18(c), respectively.

EMBODIMENTS FOR CARRYING OUT THE INVENTION

Figure 2:
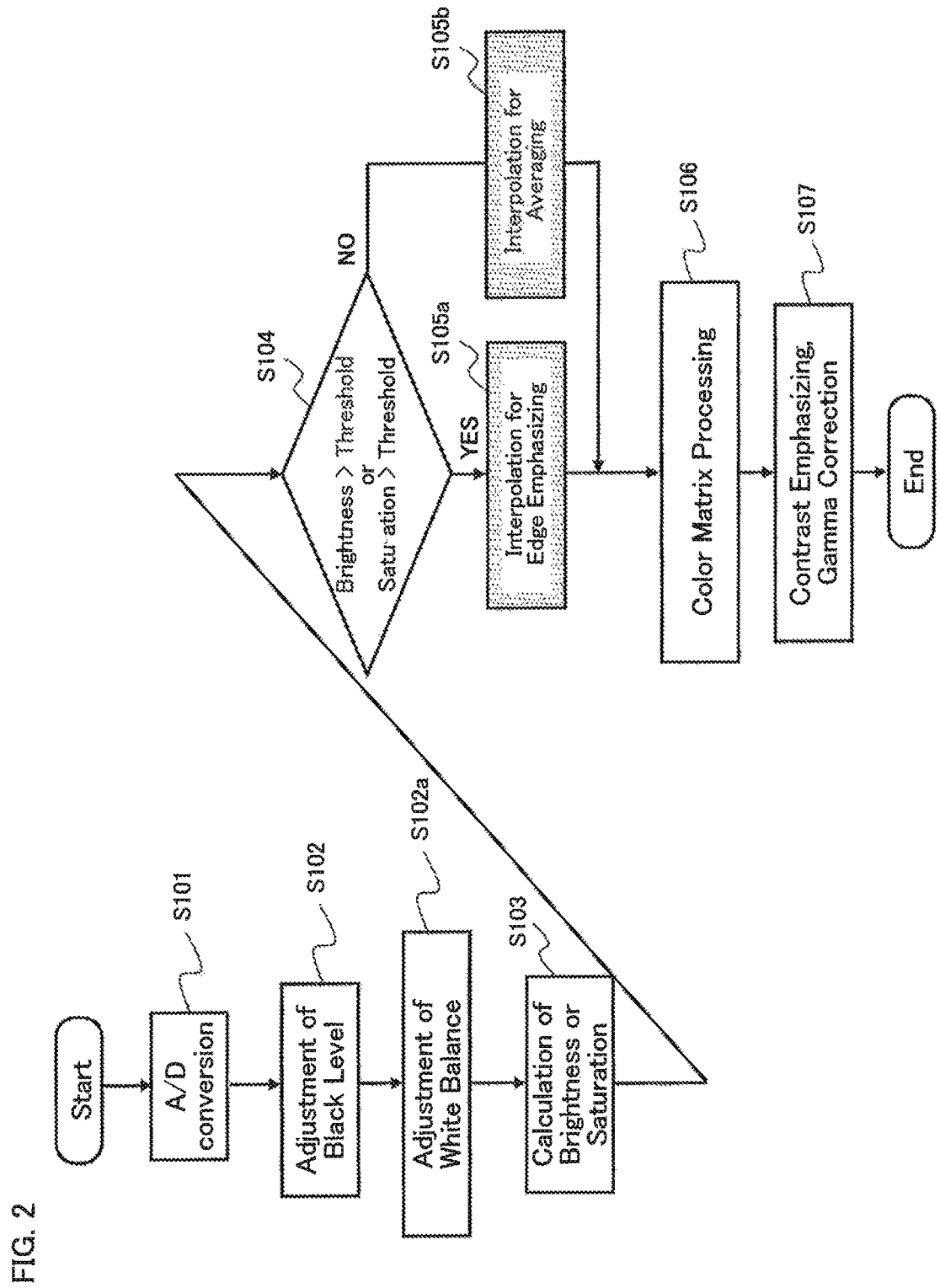
FIG. 2 is a flowchart for describing operations of a solid-state imaging apparatus according to Embodiment 1 of the present invention, where an operation for digitalizing and signal-processing a pixel signal is shown with a flow chart.

Hereinafter, embodiments of the present invention will be described with reference to accompanying drawings.

Embodiment 1

FIG. 1 is a diagram for describing a solid-state imaging apparatus according to Embodiment 1 of the present invention, where FIG. 1(a) schematically shows an overall configuration of a camera system comprising the solid-state imaging apparatus and FIG. 1(b) shows a configuration of a signal processing apparatus constituting the solid-state imaging apparatus.

A solid-state imaging apparatus 100a according to Embodiment 1 is a CCD solid-state imaging apparatus comprising a CCD image sensor (imaging element) 1 for photoelectrically converting light from a subject to output a pixel signal; a CCD driving circuit 100b for driving the CCD image sensor 1: and a signal processing apparatus 100 for performing A/D conversion on pixel signals Ag output from the CCD image sensor 1 and for performing signal processing on digital pixel signals Dg obtained by the A/D conversion. Herein, the CCD image sensor 1 is identical to the conventional image sensor 1 shown in FIG. 10(b).

The CCD solid-state imaging apparatus 100a constitutes a camera system 1000 functioning as a digital camera, together with an optical system 100c for guiding light from a subject to the CCD image sensor 1. The optical system 100c comprises: a plurality of lenses 111 to 113 arranged on a optic axis Da thereof; and an aperture mechanism 114. The lens 112 is a movable lens movably configured in an optic axis direction Ds, and a focal distance of the optical system is adjustable via the movable lens 112. Furthermore, the digital camera system 1000 comprises a camera operation section 100d for outputting, by a user operation, operation signals M1 and M2 for adjusting the movement amount of the movable lens 112 and the degree of opening of the aperture mechanism 114, to the movable lens 112 and the aperture mechanism 114.

The CCD driving circuit 100b is configured to generate a driving signal Sd for a horizontal CCD and a vertical CCD as well as a control signal Sc for a shutter operation in the CCD image sensor and to supply these signals to the CCD image sensor.

Hereinafter, the signal processing apparatus 100 will be described in detail.

The signal processing apparatus 100 is a signal processing apparatus for performing signal processing on the analog pixel signals Ag corresponding to each of the pixels from the CCD image sensor 1.

Figure 10:
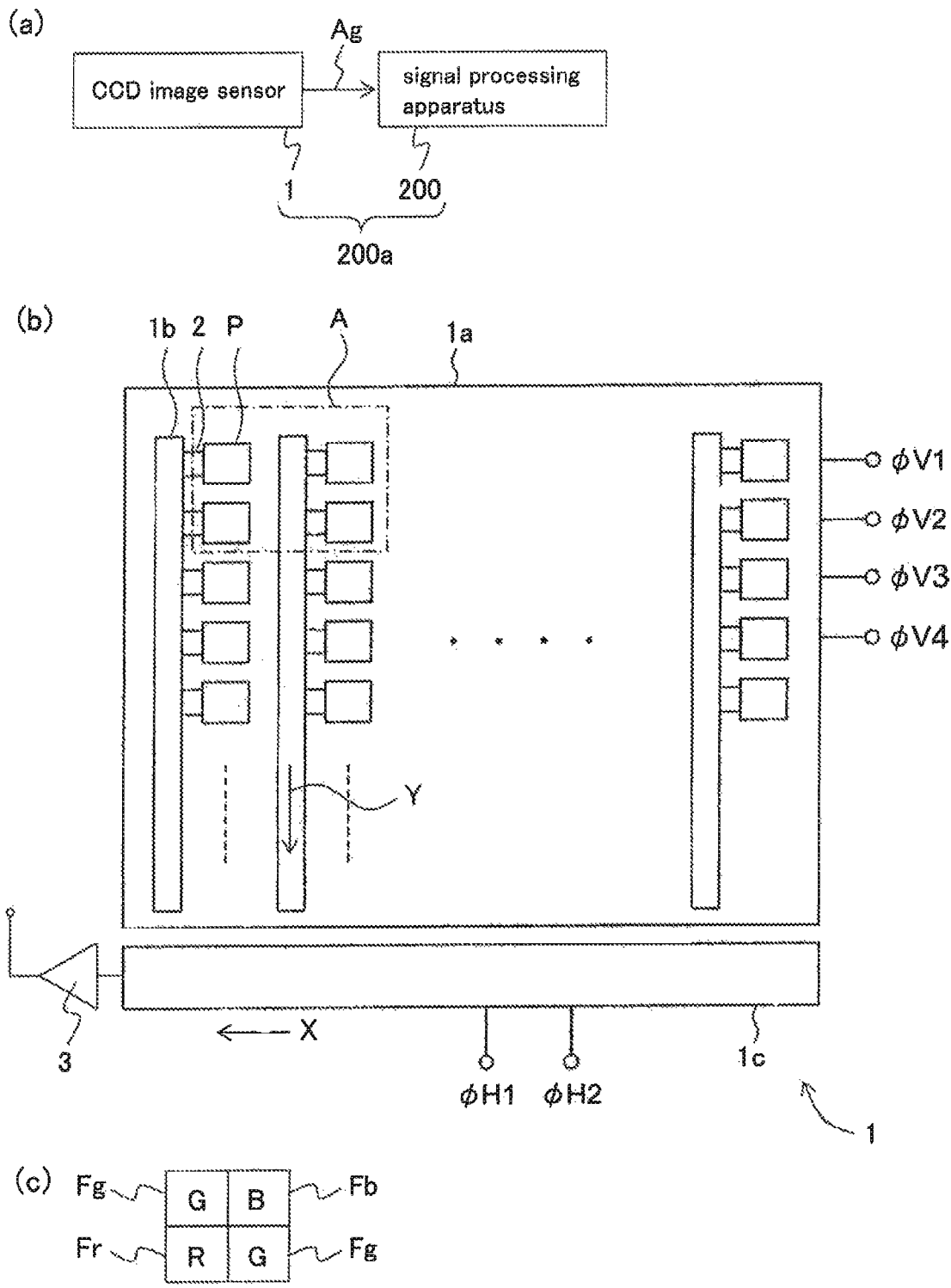
FIG. 10 is a diagram for describing a conventional CCD solid-state imaging apparatus, where FIG. 10(a) schematically shows an overall configuration of the conventional solid-state imaging apparatus.
Figure 11:
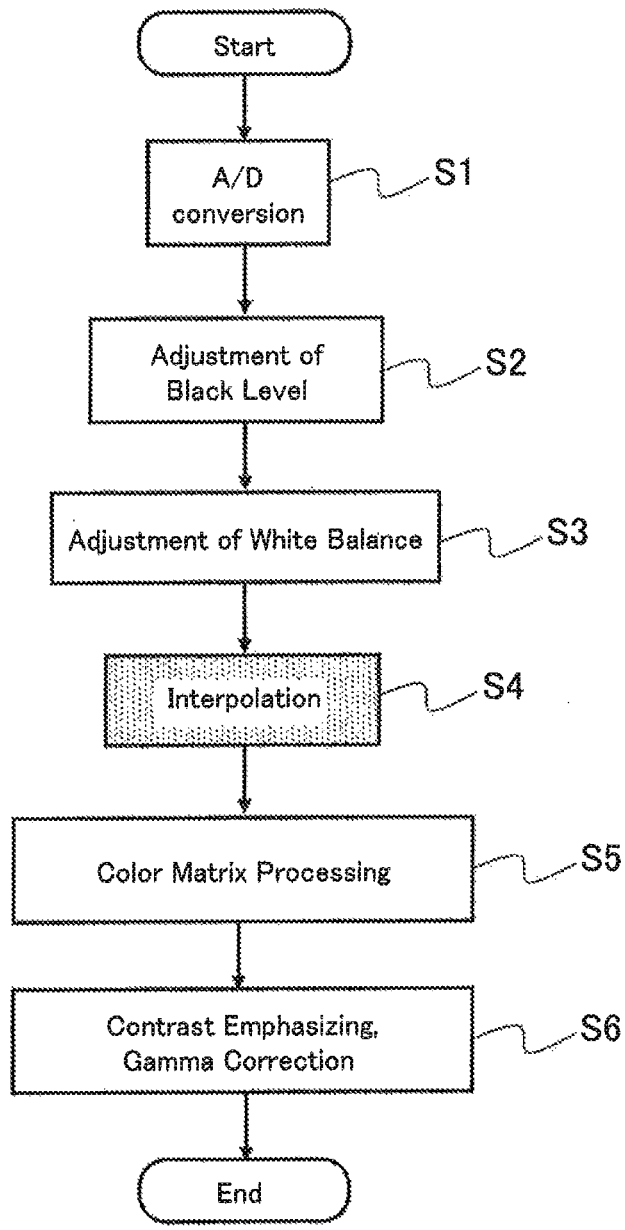
FIG. 11 is a diagram for describing an operation of a conventional solid-state imaging apparatus, showing an operation of digitalizing and signal-processing an analog image signal in a flow chart.

Specifically, the signal processing apparatus 100 comprises: an A/D converter 101 for performing A/D conversion on analog pixel signals Ag, corresponding to each of pixels, from the CCD image sensor 1 to output digital pixel signals Dg; a level adjusting circuit 105*a* for performing adjustment processing on a signal level such as a black level to the digital pixel signals Dg from the A/D converter 101; an image buffer 102 for storing digital pixel signals Rg, on which the level adjustment processing has been performed, for several lines of a pixel section 1*a* (see FIG. 10(*b*)) in the CCD image sensor 1; a brightness or saturation determining section 103 for determining brightness or saturation of one or more pixels for each pixel using the digital pixel signals Db stored in the image buffer 102; and an interpolation processing section 104 for performing interpolation processing that interpolates a pixel signal of a target pixel, using a pixel signal of a peripheral pixel positioned in the periphery of the target pixel, based on brightness or saturation of the determined pixel.

Herein, the brightness or saturation determining section 103 comprises: a brightness or saturation detecting section 103*a* for detecting brightness or saturation of each pixel; and a brightness or saturation comparing section 103*b* for comparing the detected brightness or saturation of the pixel with a predetermined threshold value. Based on this comparison result, the brightness or saturation determining section 103 determines whether or not at least one of the brightness and saturation for each pixel is greater than a predetermined threshold value, and outputs information Dr of the determined result.

Specifically, the brightness or saturation determining section 103 is normally configured to receive digital pixel signals Db of a target pixel to be interpolated and peripheral pixels thereof from the image buffer 102 to calculate either or both of the brightness or saturation of the target pixel, to compare information of the obtained brightness or saturation with a predetermined threshold value or a threshold value that is set by the camera system, and to output determination information Dr indicating a comparison result to the interpolation processing section 104.

The interpolation processing section 104 also performs adaptive interpolation processing of selecting, for each pixel, interpolation processing suitable for a determination result relating to the brightness or saturation of a target pixel from among at least two or more types of interpolation processing, and interpolating a pixel signal of the target pixel by the selected interpolation processing.

Herein, the interpolation processing section 104 comprises an interpolation processing circuit [1] 104*a* for performing first interpolation processing; an interpolation processing circuit [2] 104*b* for performing second interpolation processing, which is different from the first interpolation processing; and an interpolation processing switching circuit 104*c* for switching the type of interpolation processing performed by the interpolation processing section 104, between the first interpolation processing and second interpolation processing, based on the determination signal Dr indicating a determination result from the brightness or saturation determining section 103. Specifically, the interpolation processing switching circuit 1040 is configured to supply the digital pixel signal Db stored in the image buffer 102 to either of the interpolation processing circuit [1] 104*a* and the interpolation processing circuit [2] 104*b*, based on the determination signal Dr, so that appropriate interpolation processing, either the first interpolation processing or the second interpolation processing, will be performed on the digital pixel signal Db.

Figure 13:
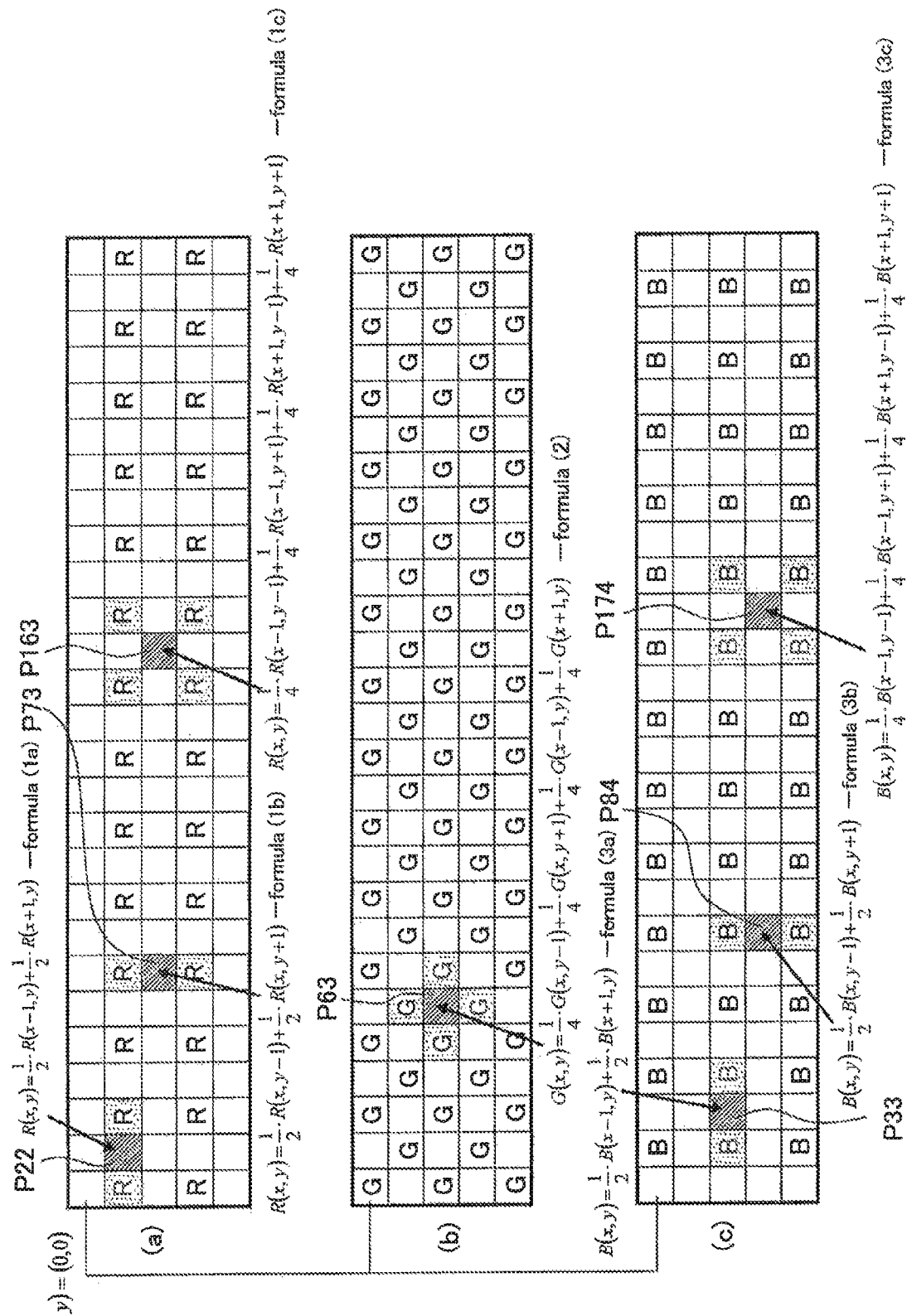
FIG. 13 is a diagram for describing linear interpolation processing in a signal processing apparatus constituting a conventional solid-state imaging apparatus, where

It should be noted that the first interpolation processing performed by the interpolation processing circuit [1] 104*a* is one of the types of interpolation processing for making edge emphasis as shown in FIG. 14, 15, 16 or 17. It should also be noted that the second interpolation processing performed by the interpolation processing circuit [2] 104*b* is one of the types of interpolation processing for averaging pixel signals as shown in FIG. 13 or 18.

The digital pixel signals on which interpolation processing as described above has been performed by the interpolation processing section become RGB digital pixel signals including a digital pixel signal of a red color (R pixel value), a digital pixel signal of a green color (G pixel value), and a digital pixel signal of a blue color (B pixel value) for each pixel.

The signal processing apparatus 100 further comprises an image quality adjusting circuit 105*b* for performing image quality adjustment processing, such as color matrix processing, contrast adjustment processing, and gamma correction processing on the RGB digital pixel signals.

First, the operation of the overall camera system will be described.

When the power of the camera system is turned on, a driving signal Sd and a shutter control signal Sc are supplied from the CCD driving section 100*b* to the CCD image sensor 1, which allows the CCD image sensor 1 to perform imaging operations. The imaging operations in the CCD image sensor 1 are similar to those described with reference to FIG. 10(*b*).

Furthermore, the adjustment of a focal point is performed by the movement of the movable lens 112 in response to the operation signal M1 from the camera operating section 100*d*, and the adjustment of the aperture in the aperture mechanism 114 is performed in response to the operation signal M2 from the camera operating section 100*d*.

In addition, when the analog pixel signals Ag obtained by the imaging by the CCD image sensor 1 are output to the signal processing apparatus 100 in a subsequent stage thereof, signal processing on the analog pixel signals Ag is performed.

FIG. 2 is a flowchart for describing operations of the signal processing apparatus 100.

First, A/D conversion is performed by the A/D converter 101 on analog pixel signals Ag read out from the pixels of the CCD image sensor 1, so as to convert the signals into digital pixel signals Dg (step S101).

Next, in the level adjusting circuit 105*a*, level adjustment processing is performed on the digital pixel signals Dg. For example, for the level adjustment processing, it is desirable to perform black level adjustment (step S102) similar to the conventional signal processing apparatus 200, and perform adjustment for a white balance (step S102*a*). Although it is possible to perform defect elimination and noise rejection at any stage of the signal processing, it is more effective to perform them at as early a stage as possible and prior to interpolation processing. It is noted that if the adjustment of white balance is performed prior to interpolation processing, the calculation amount can be reduced, but it is also possible to perform the adjustment after interpolation processing.

Digital pixel signals Rg thus obtained by performing the level adjustment processing on the digital pixel signals Dg from the A/D converter 101 are stored in the image buffer 102 for several rows of pixels in the pixel section of the CCD image sensor 1.

Next, in the brightness or saturation detecting section 103a, digital pixel signals Dg of a certain pixel and pixels positioned in the periphery thereof are read out to obtain the brightness or saturation of the target pixel (step S103).

Specifically, a certain pixel is focused on and digital pixel signals including the pixels in the periphery of the pixel that is focused (focused pixel), are used to derive either or both of the brightness and saturation.

While the most simple method is a method for determining brightness using the digital pixel signals of G pixels, there is also a more accurate method, in which digital pixel signals of adjacent R pixels, G pixels and B pixels are added at a ratio of about 3:6:1 respectively and the level of the thus obtained digital pixel signals is determined to be a luminance level.

It is noted that a way of obtaining luminance can be used for brightness. Since various methods are known for obtaining luminance, the description thereof will be omitted herein. However, for the simplification of calculation, it is also possible to use a pixel signal obtained by adding, through appropriate weighting, pixel signals of R, G and B pixels, which are peripheral pixels near the target pixel, as the luminance of a target pixel.

For the brightness of the target pixel, it is also possible to use a luminance signal obtained from pixel signals of pixels positioned in the arrangement area of the peripheral pixels used for interpolation processing of the target pixel.

While it is desirable to use a color matrix to obtain a luminance level accurately, it is also possible to omit the use of a color matrix. In addition, if digital pixel signals based on noise, defects, or the like can be appropriately removed, it is normally desirable to select the digital pixel signal with the highest signal level from among the digital pixel signals of peripheral pixels used for the determination of the focused pixel and to determine the brightness of the focused pixel using the signal level of the digital pixel signal.

In addition, for saturation, it is possible to use a method to obtain ab of Lab, or a*b* of La*b*. Further, for more simplification, with a difference between output signals of a G pixel and a R pixel defined as a and with a difference between output signals of a G pixel and a B pixel defined as b*, it is possible to obtain an absolute value for substitution. Further, preferably, it is possible to use both brightness and saturation for determination standards.

Specifically, it is also possible to obtain the saturation of a target pixel from a difference between pixel signals of green and red, and a difference between pixel signals of green and blue, among the pixel signals of peripheral pixels used for interpolation processing of the target pixel.

In addition, in the brightness or saturation comparing section 103b, the brightness or saturation of the target pixel, as the interpolation target, is obtained from the brightness or saturation detecting section 103a, it is compared with a preset threshold value of brightness or saturation, and determination information Dr indicating a comparison result is output to the interpolation processing section 104. In the interpolation processing section 104, the interpolation processing switching circuit 104c operates to perform adaptive interpolation processing for adaptively switching a plurality of types of interpolation processing to be executed based on the determination information Dr (step S104).

For the case where both brightness and saturation are used for the determination standards, only if both the brightness and saturation of the target pixel are smaller than the corresponding threshold values, then the second interpolation processing (averaging) will be selected. For other cases, the first interpolation processing (edge emphasis) will be selected.

During this interpolation processing, memory management is performed such that: pixel signals of several rows necessary for interpolation are temporarily stored in the buffer; and when an interpolation result of target rows is output, the rows will be shifted to the next several rows, to devise a way to minimize the amount necessary as capacity of the memory.

In addition, while there is no limitation to the threshold values for determining which type of interpolation processing is to be performed, some examples will be illustrated to carry out the present invention as appropriate.

First, it is conceivable to set a threshold value for switching the type of interpolation processing of the target pixel from the interpolation processing for edge emphasis to the interpolation processing for averaging digital pixel signals, when an average value of digital pixel signals of the green color of the peripheral pixels positioned near the pixel to be interpolated (target pixel) is 5% or less of the full scale, or when the average value of the luminance level of the peripheral pixels positioned near the pixel to be interpolated is obtained and the average value is 5% or less of the full scale.

On the other hand, the following indicators can be used for the threshold value of saturation.

Saturation is one of the three attributes of colors. Saturation is a scale for the brightness of colors, which is fundamentally represented by the distance from the central axis (achromatic color axis) of the color space. In achromatic colors (white, black and gray), this distance will be zero, and the saturation will be closer to a pure color as the distance gets farther from the achromatic color axis.

For example, the color space of the La*b* color coordinate system can be considered as a sphere, where the axis in the longitudinal direction is an axis for brightness (achromatic color axis), L* indicates a position on the achromatic color axis, L*=0 indicates black, and L*=100 indicates white. In addition, in the axis of a* that is orthogonal to the achromatic color axis, positive values indicate colors closer to red, while negative values indicate colors closer to green. In the other axis of b* that is orthogonal to the achromatic color axis, positive values indicate colors closer to yellow, and negative values indicate colors closer to blue. The axis of a* is orthogonal to the axis of b*, and colors can be quantitatively defined by the coordinates on a plane including the axis of a* and the axis of b*. The colors on both sides of the axis of a* and of the axis of b* have the relationship of complementary colors.

Thus, for the threshold value for saturation, it is conceivable for the value of as and b* to be 20 or less, or for the value of $(a*^2+b*^2)^{0.5}$ to be 20 or less.

It is also possible to use a color space of Munsell color system as the color space, to define brightness and saturation.

For the purpose of suppressing noise as appropriate, it is possible to set the threshold value of brightness or saturation based on a more physical value, the noise level in the pixel signals of the CCD image sensor, or the illuminance level on the light-receiving surface of the CCD image sensor.

For example, there is a method for determining the threshold value based on the noise level of pixels or the CCD image sensor. For example, if the noise level in pixel signals of the CCD image sensor is 3 electrons, then the signal level as a threshold value to determine brightness may be set to be ten times of the noise level, or 30 electrons. Alternatively, for example, the signal level of digital pixel signals in the CCD image sensor may be measured when the product of the surface illuminance on the light-receiving surface of the CCD image sensor and the shutter time is 0.003 lux*s, which will be a threshold value of the brightness of the signal level.

Furthermore, the type of interpolation processing will be switched for the case when the brightness (or saturation) of the target pixel to be interpolated is greater or smaller than the corresponding threshold value.

Specifically, if the brightness (or saturation) of the target pixel is greater than the threshold value, then the interpolation processing for performing edge emphasis as shown in FIG. 14, 15, 16 or 17 will be performed; and if the brightness (or saturation) of the target pixel is smaller than the threshold value, then the processing for averaging as shown in FIG. 13 or 18 will be performed.

The detailed explanation will be provided hereinafter.

In a case where the brightness or saturation of the target pixel is greater than the threshold value, in other words, in a case where the target pixel is a pixel having high brightness or saturation, edge emphasis is performed on the digital pixel signals of the target pixel, in the interpolation using the digital pixel signals of the peripheral pixels (step 105a). Specifically, the digital pixel signals of the peripheral pixels are subtracted, or the interpolation is performed using the digital pixel signals of the pixels arranged in the direction with less gradient decided by a conditional formula. As a result, edge emphasis for making a border to be more distinct will be performed.

On the other hand, in a case where the brightness or saturation of the target pixel is smaller than the threshold value, in other words, in a case where there is not any target pixel, or peripheral pixels thereof, having high brightness or saturation, the interpolation processing for averaging is performed, in consideration of the peripheral pixels (step S105b). As such, the interpolation processing is performed by the averaging of pixel signals, so that noise will be improved based on the number of pixels for the averaging while the resolution will be reduced. During the averaging, it is also possible to appropriately weigh the digital pixel signals used for the interpolation.

Subsequently, color matrix processing is performed on the digital pixel signals that have been subjected to the interpolation processing, to match the characteristics of the pixel signals of the respective R, G and B colors (RGB pixel signals) output from the CCD image sensor, with the sensitivity characteristics to the respective R, G and B colors of the human eyes so that a natural color image will be displayed (step S106).

Furthermore, contrast adjustment processing and gamma correction processing are performed on the RGB pixel signals that have been subjected to the color matrix processing, to generate digital image signals (step S107) and the digital image signals are output.

Next, the working effect of Embodiment 1 will be described.

According to Embodiment 1, in the signal processing apparatus for performing signal processing on pixel signals corresponding to a plurality of pixels, the adaptive interpolation processing is performed, in which the brightness or saturation of each pixel is determined, and an appropriate type of interpolation processing is selected and executed from among two types of interpolation processing based on the determined brightness or saturation of the pixel. Thus, it becomes possible to reduce noise and improve S/N by interpolation in an area with low brightness or saturation on a display screen, and it becomes possible to increase resolution by edge emphasis in an area with high brightness or saturation on the display screen.

In particular, for a pixel with low brightness, it becomes possible to prevent noise from being obvious by interpolating a digital pixel signal that is obtained by mixing and averaging digital pixel signals of pixels, as a digital pixel signal of a target signal, as in the second interpolation processing (FIGS. 13 and 18).

Furthermore, for the pixel with low saturation, it becomes possible to display the white, black and gray colors more beautifully by interpolating one that is obtained by mixing and averaging digital pixel signals of peripheral pixels, as a digital pixel signal of a target signal, as in the second interpolation processing (FIGS. 13 and 18).

Furthermore, for the pixel with high brightness, the interpolation processing involving edge emphasis is performed for interpolating a digital pixel signal of a target pixel, using the difference obtained by subtracting digital pixel signals among peripheral pixels, as in the first interpolation processing (FIGS. 14 to 17), so that the outline (border) of a subject can be enhanced and a clear image can be obtained.

Figure 17:
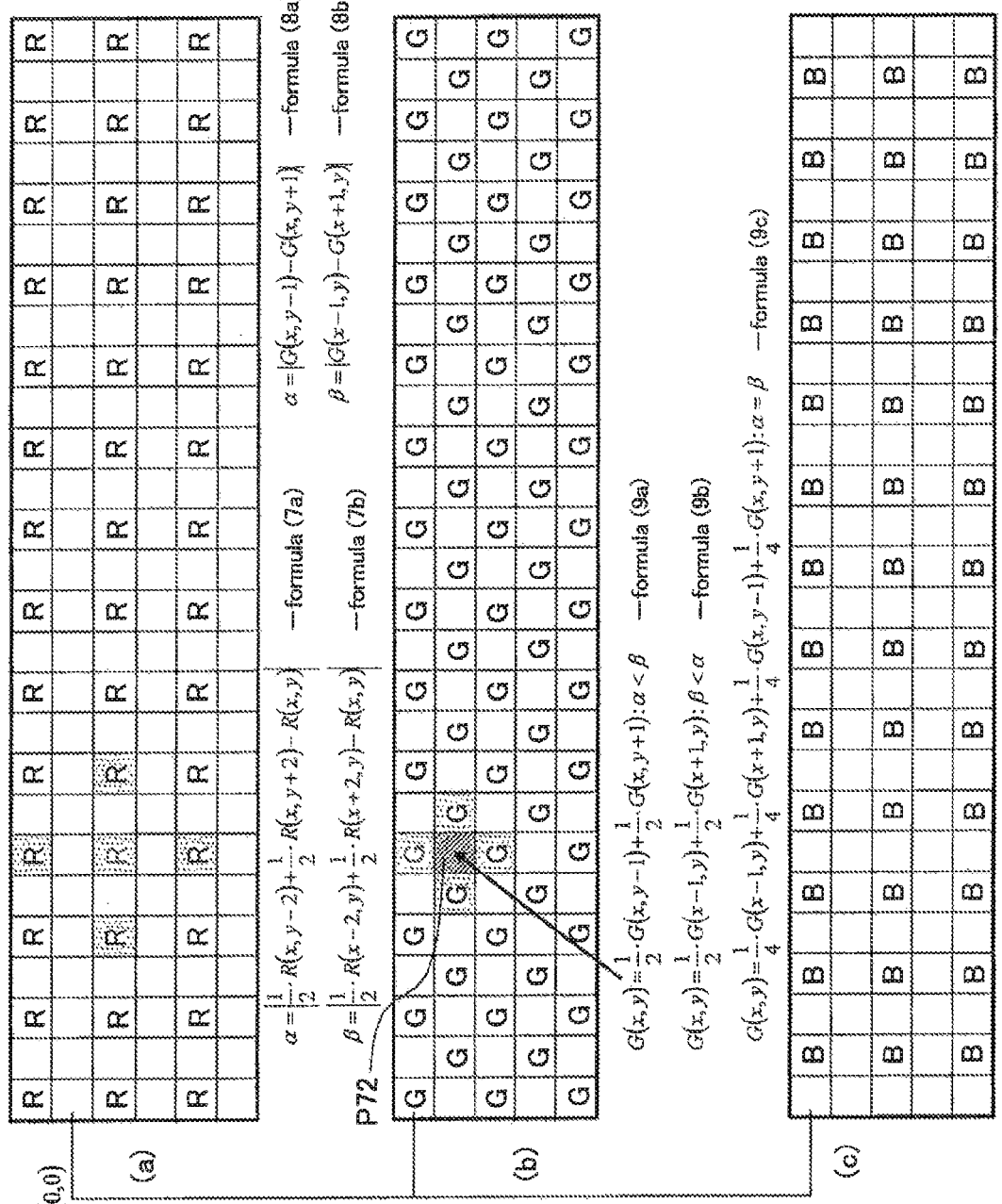
FIG. 17 is a diagram for describing interpolation processing that is in consideration of a pixel value gradient in a signal processing apparatus constituting a conventional solid-state imaging apparatus, where an arrangement of pixels in the pixel section shown in FIG. 10(b) are separately indicated with the colors, red, green and blue, in FIGS. 17(a), 17(b) and 17(c), respectively.

Furthermore, for the pixel with high brightness as shown in FIG. 17, the gradation of the level of pixel signals is obtained using digital pixel signals of peripheral pixels, and the pixels are narrowed down to those arranged in the direction with a gentle gradient among the pixels used for interpolation. As a result, interpolation for edge emphasis can be performed and a clear image can be obtained.

Furthermore, since the pixel with high saturation is a pixel that has a high visual attraction, it is effective to perform interpolation processing involving edge emphasis.

Figure 14:
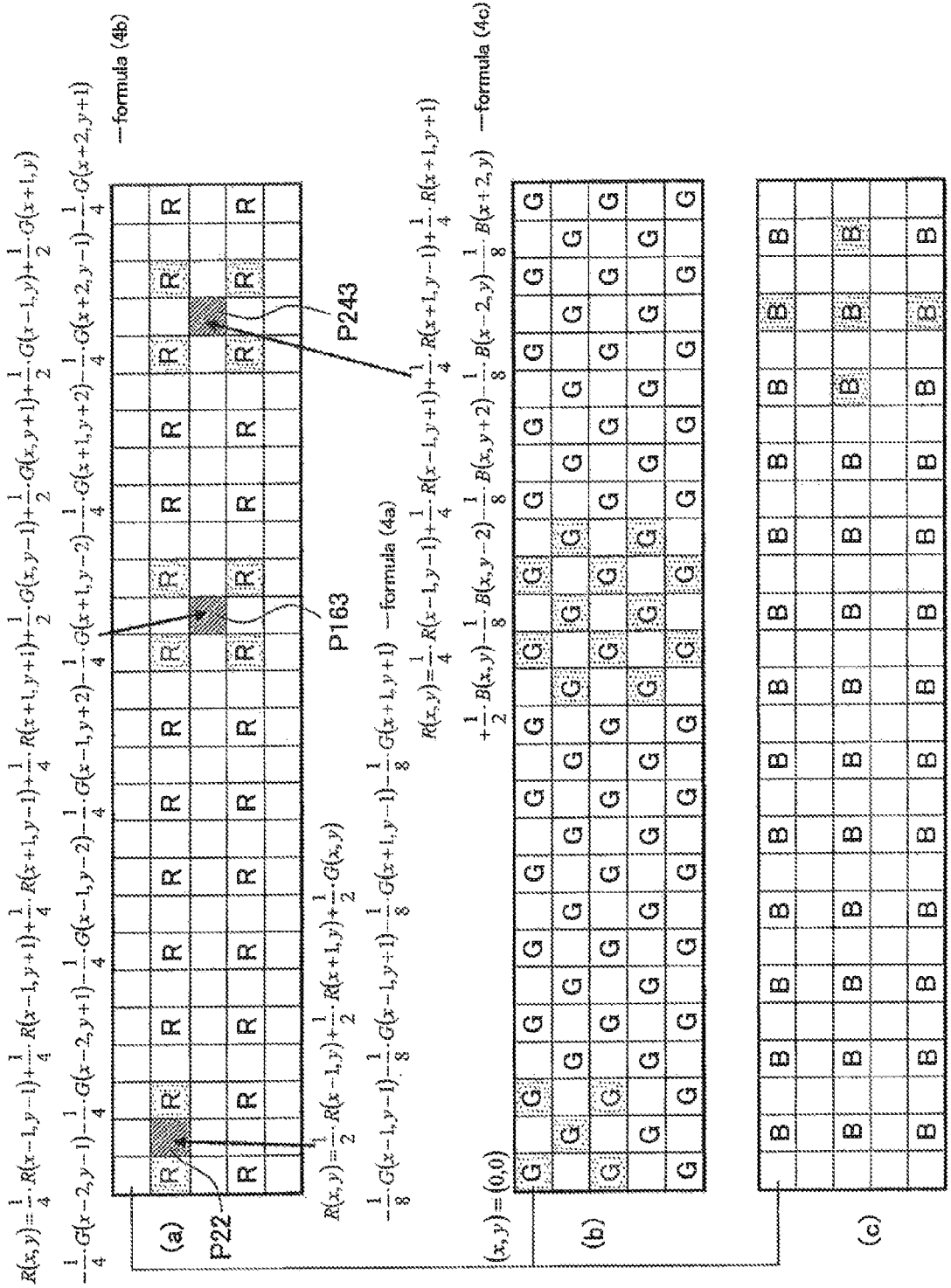
FIG. 14 is a diagram for describing edge emphasis of a R pixel signal in a signal processing apparatus constituting a conventional solid-state imaging apparatus, showing an arrangement of R pixels (FIG. 14(a)), an arrangement of G pixels (FIG. 14(b)) and an arrangement of B pixels (FIG. 14(c)), in a pixel section separately.
Figure 15:
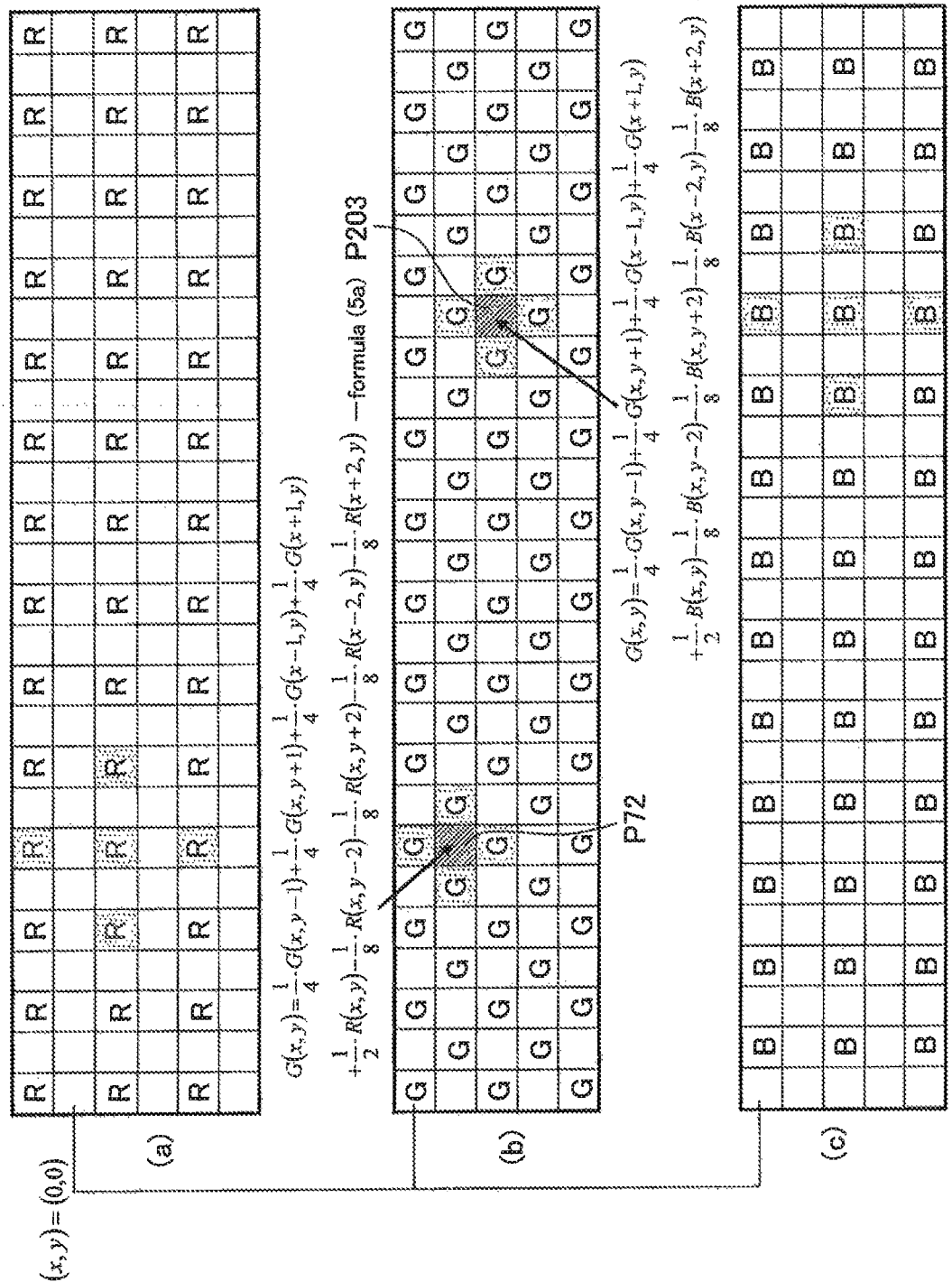
FIG. 15 is a diagram for describing edge emphasis of a G pixel signal in a signal processing apparatus constituting a conventional solid-state imaging apparatus, showing an arrangement of R pixels (FIG. 15(a)), an arrangement of G pixels (FIG. 15(b)) and an arrangement of B pixels (FIG. 15(c)), in a pixel section separately.
Figure 16:
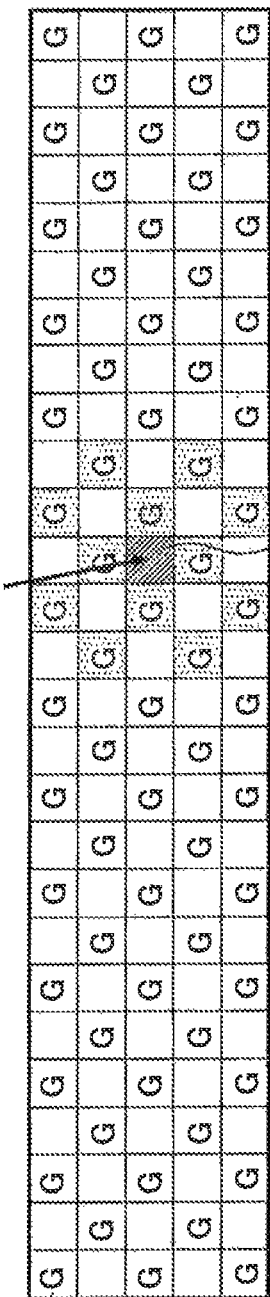
FIG. 16 is a diagram for describing edge emphasis of a G pixel signal in a signal processing apparatus constituting a conventional solid-state imaging apparatus, showing an example of performing edge emphasis processing of a G pixel signal using only G pixels.

Furthermore, as in the interpolation processing involving edge emphasis shown in FIGS. 14 and 15, interpolation processing for edge emphasis is performed using digital pixel signals of peripheral pixels of colors other than the color of a digital pixel signal of a target pixel to be interpolated, and in particular, edge emphasis is performed using digital pixel signals of the G pixels, twice as many of which are arranged as R pixels and B pixels, so that resolution can be increased even further.

Furthermore, when an output signal of a pixel having a color filter that is of the same color as the color to be interpolated is used, it becomes possible to prevent a false color from being generated.

Furthermore, by obtaining the brightness or saturation of a target pixel using pixels in a pixel area used for interpolation (i.e., peripheral pixels used for the interpolation of the target pixel) and peripheral pixels that will not be used for that interpolation positioned in the periphery of the target pixel, it becomes possible to determine the brightness or saturation of the target pixel in consideration of the peripheral pixels adjacent to the target pixel, which is the subject of the interpolation. Furthermore, by switching the type of interpolation processing to the target pixel based on the thus obtained brightness or saturation of the target pixel, it becomes possible to select appropriate interpolation processing even if there is an edge near the target pixel.

Furthermore, by obtaining brightness or saturation of a plurality of pixels in a pixel area used for interpolation (i.e., peripheral pixels used for the interpolation of a target pixel), it becomes possible to select a more appropriate type of interpolation processing. Desirably, if the brightness or saturation is obtained for each pixel in such a case, it becomes possible to select a far more appropriate type of interpolation processing. In this case, it is also possible to obtain the brightness or saturation of the target pixel using pixel signals of a plurality of pixels including pixels of different colors in an area including peripheral pixels used for the interpolation of the pixel signal of the target pixel, and determine the brightness or saturation of the target pixel (to perform comparison with respective threshold values) using the obtained brightness or saturation of the target pixel, to select the type of interpolation processing based on this determination result.

Furthermore, in a case where brightness or saturation of a plurality of pixels in a pixel area used for interpolation (i.e., peripheral pixels used for the interpolation of a target pixel) is obtained, the brightness or saturation of the target pixel is determined by using the highest brightness or saturation as the brightness or saturation of the target pixel, so that an appropriate determination can be made for the switching of interpolation processing.

Furthermore, since the green color is most important for wavelengths for allowing brightness to be visually sensed, the determination of brightness or saturation of the target pixel for switching interpolation processing is performed with the digital pixel signals of G pixels among the peripheral pixels as the standard. Thus, it becomes possible to switch the types of interpolation processing with a little calculation based on digital pixel signals of a single color.

In Embodiment 1, the adaptive interpolation processing selects and executes appropriate interpolation processing from two types of interpolation processing based on whether or not the brightness or saturation of the target pixel is greater than a corresponding threshold value. However, the adaptive interpolation processing may also select and execute appropriate interpolation processing from three types of interpolation processing based on the relationship in size between the brightness or saturation of the target pixel and a plurality of corresponding threshold values.

The two types of interpolation processing are for interpolating a pixel signal of the target pixel using a pixel signal obtained by multiplying pixel signals of the peripheral pixels by different coefficients, and thus, the color tone will be difficult to change and a natural coloration can be obtained by setting the sum of the coefficients to be 1.

Furthermore, the two types of interpolation processing are for interpolating a pixel signal of the target pixel using a pixel signal obtained by multiplying pixel signals of the peripheral pixels by different coefficients, and for each type of interpolation processing, regarding the coefficient, it is also possible to use coefficients obtained through continuous change based on the determined brightness or saturation of the target pixel.

For example, FIG. 4 exemplifies interpolation processing that is a variation of the interpolation processing shown in FIG. 14. In the interpolation processing shown in FIG. 4, a coefficient k is changed so that edge emphasis will continuously be changed. The coefficient k in this case may be a linear function or a logarithmic function of the values of the brightness or saturation of the target pixel.

Figure 3:
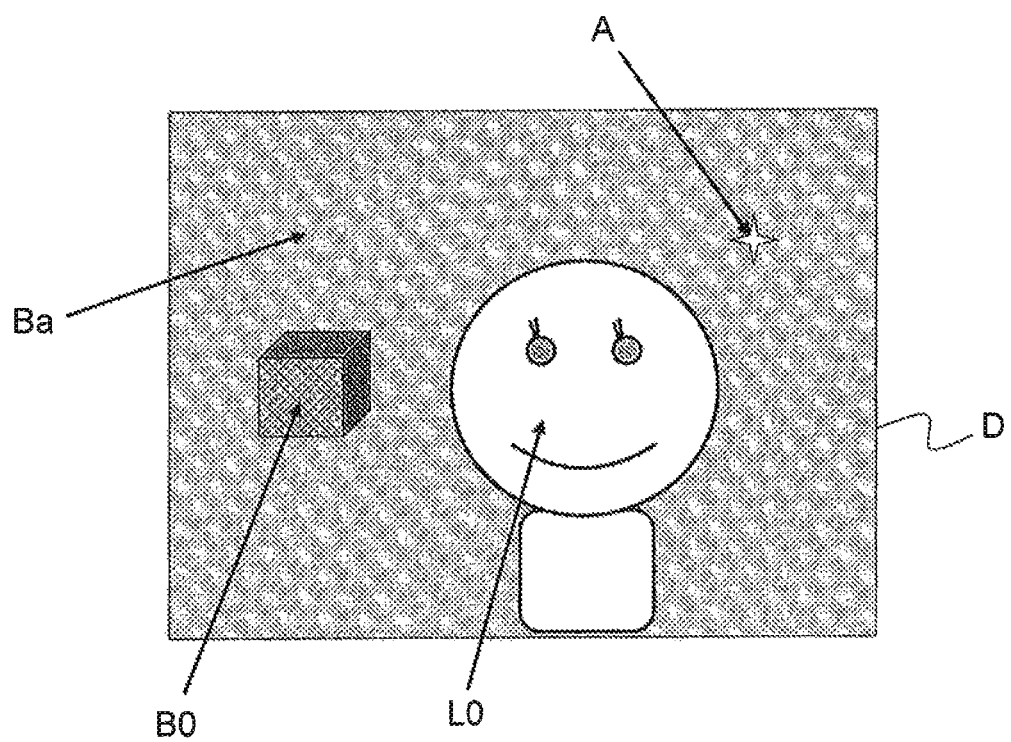
FIG. 3 is a diagram for describing an effect of the present invention.

FIG. 3 is a diagram for describing an effect of adaptive interpolation processing by a signal processing apparatus according to Embodiment 1.

In a case where an image is displayed by using the digital pixel signals obtained by performing the adaptive interpolation processing in the signal processing apparatus 100 according to Embodiment 1, the point light source A can be clearly displayed on a display screen D as shown in FIG. 3. Further, the contours of the brightly-shown person can be clearly displayed by edge emphasis. Further, noise is not obvious for the dark object 80 in the display screen. Further, noise is not obvious similarly for the dark background part Ba.

Embodiment 2

FIG. 5 is a diagram for describing a solid-state imaging apparatus according to Embodiment 2 of the present invention, where FIG. 5(a) schematically shows an overall configuration of a camera system including the solid-state imaging apparatus and FIG. 5(b) shows a configuration of a signal processing apparatus constituting the solid-state imaging apparatus.

A solid-state imaging apparatus 110a according to Embodiment 2 uses a signal processing apparatus comprising a noise rejecting circuit 106 for performing noise rejection processing on digital pixel signals Dg from an A/D converter 101 instead of the signal processing apparatus 100 in the solid-state imaging apparatus 100a according to Embodiment 1. The remaining configuration is identical to that of the solid-state imaging apparatus 100a according to Embodiment 1.

The solid-state imaging apparatus 110a constitutes a camera system 1100 functioning as a digital camera together with an optical system 100c for guiding light from a subject to a CCD image sensor 1. The optical system 100c is identical to the one in Embodiment 1.

The noise rejecting circuit 106 performs noise rejection processing for reading digital pixel signals Db from an image buffer 102 and replacing any of the digital pixel signals Db, which is sufficiently different from an average value or intermediate value of a digital pixel signal of pixels positioned in the periphery of one pixel, with the average value or intermediate value.

Thus, a brightness or saturation determining section 103 and an interpolation processing section 104 will be able to perform signal processing by using digital pixel signals from which noise is rejected.

In Embodiment 2, while the noise rejecting circuit 106 is provided to perform noise rejection processing prior to the determination processing on brightness or saturation and interpolation processing of a target pixel, the noise rejection processing may be performed during the determination processing on brightness or saturation, and during the interpolation processing.

In this case, the noise rejection circuit memorizes a pixel with noise based on digital pixel signals of a plurality of pixels stored in an image buffer, and the image buffer is controlled so that the digital pixel signal of the pixel with noise will not be output to the brightness or saturation determining section 103 or interpolation processing section 104. Thus, it becomes possible for the brightness or saturation determining section 103 and interpolation processing section 104 to reject the noise of the digital pixel signal during the determination processing on brightness or saturation, and during the interpolation processing.

Furthermore, in addition to the noise processing, it is also possible to perform a shading correction, that is to say, processing to correct the difference between digital pixel signals at a central part and a peripheral part of a light-receiving surface, resulted from characteristics of an optical system, or a gradient of driving voltage of a transfer gate or the like within the light-receiving surface.

It is noted that processing, such as defect elimination, may be performed before or after storing digital pixel signals into the image buffer, or by using the image buffer.

Embodiment 3

FIG. 6 is a diagram for describing a solid-state imaging apparatus according to Embodiment 3 of the present invention, where FIG. 6(a) schematically shows an overall configuration of a camera system including the solid-state imaging apparatus and FIG. 6(b) shows a configuration of a signal processing apparatus constituting the solid-state imaging apparatus.

A solid-state imaging apparatus 120a according to Embodiment 3 uses a signal processing apparatus 120 comprising an interpolation processing section 114 configured to restrict adaptive interpolation processing to digital pixel signals Dg from an A/D converter 101 based on a light gathering state of an optical system of a camera system 1200, instead of the signal processing apparatus 100 in the solid-state imaging apparatus 100a according to Embodiment 1. The remaining configuration is identical to that of the solid-state imaging apparatus 100a according to Embodiment 1.

Specifically, in Embodiment 3, the interpolation processing section 114 is configured to restrict the adaptive interpolation processing for adaptively switching the types of interpolation processing based on the brightness or saturation of a target pixel obtained by the brightness or saturation determining section, based on information Lc that indicates the converging state from the optical system of the camera system 1200.

For example, there is a case where it is desirable to restrict the adaptive interpolation processing based on the brightness of a light source, or based on information of the amount of light in the periphery of a light-receiving section.

This is because it is desirable for the adaptive interpolation processing to not operate in a state when a sky or forest background is brighter than a subject during image-capturing against the light in the outside during the day time, or when the sky is brighter than a subject with the setting sun, or when it is brighter outside the window than in a room during an image-capturing.

Furthermore, it is desirable to determine whether or not to perform the adaptive interpolation processing based on the amount of light. This is because it will not be necessary to perform a separate interpolation for averaging when it is so bright and saturation is so high that the adaptive interpolation processing is not necessary. When the adaptive interpolation processing is not performed because it is so bright and saturation is so high that the adaptive interpolation processing is not necessary, it is desirable to set a signal processing apparatus in advance to perform interpolation processing for edge emphasis.

In addition, in order to gauge the darkness in the light-receiving section appropriately, a sensor for measuring the amount of light may be separately provided, so that an interpolation processing switching circuit 114c may make a determination based on an output value from the sensor.

Furthermore, in Embodiment 3, the interpolation processing switching circuit 114d receives shutter information indicating a shutter time at the CCD image sensor, from a CCD driving section 100b; and the interpolation processing switching circuit 114c can always perform interpolation processing with averaging when the shutter time is extremely short, so that noise in the dark part can be reduced.

Furthermore, in Embodiment 3, it is desirable to determine whether or not to perform the adaptive interpolation processing based on the setting of a lens.

This is because the settings of a lens includes the setting of a value for an aperture and the setting of a focal distance, and it is an extremely delicate issue which edge to be emphasized or shaded off when the aperture is close to its widest state. Also, when a wide-angle lens is used with the aperture close to its narrowest, edge emphasis may be performed more since pan focus is expected.

On the other hand, since an area with a long focal distance tends to be blurry and it is difficult for the overall screen to be blurry in an area with a short focal distance, the interpolation processing switching circuit 114c may obtain information regarding a focal distance, and based on the focal distance, the degree of edge emphasis may be adjusted by changing a coefficient k as in the interpolation processing shown in FIG. 4.

In addition, since the way of shading off varies depending on the size of a CCD image sensor in a similar manner, the setting of edge intensity in interpolation processing switched by the interpolation processing section 114 needs to be made in consideration of the size of this sensor.

In addition, the adaptive interpolation processing is most effective in a location where the photo shooting environment is sufficiently dark when a part of a screen is bright. On the contrary, the adaptive interpolation processing may not be performed when the overall screen is bright.

In addition, since resolution will be decreased when it is cloudy or rainy, the adaptive interpolation processing may be adjusted such that the number of pixels to be mixed are reduced in the second interpolation processing (averaging), or such that the threshold value for switching the interpolation processing to the first interpolation processing (edge emphasis) is lowered to emphasize contours.

Figure 12:
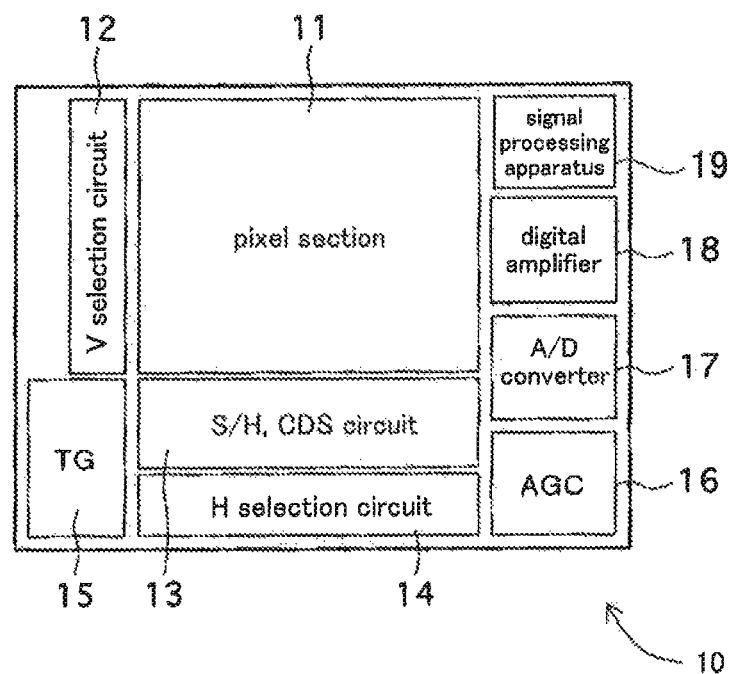
FIG. 12 is a diagram for describing a conventional CMOS solid-state imaging apparatus.

Furthermore, noise may not be problematic if the gain in an automatic gain controller 16 in the CMOS image sensor shown in FIG. 12, or the gain in a digital amplifier, does not reach a certain value. Thus, it is desirable for the interpolation processing section 114 to receive the level of such a gain to determine whether or not to perform the adaptive interpolation processing based on the magnitude of the gain.

To that end, while it is possible to set a threshold value for determining whether or not to perform the adaptive interpolation processing using an analog gain or a digital gain, this threshold value may be set using ISO sensitivity. For example, it is possible to set the adaptive interpolation processing to function at the ISO sensitivity 1600 or higher.

Embodiment 4

FIG. 7 is a diagram for describing a solid-state imaging apparatus according to Embodiment 4 of the present invention, where FIG. 7(a) schematically shows an overall configuration of a camera system including the solid-state imaging apparatus and FIG. 7(b) shows a configuration of a signal processing apparatus constituting the solid-state imaging apparatus.

A solid-state imaging apparatus 130a according to Embodiment 4 uses a signal processing apparatus 130 comprising an interpolation processing section 134 for adaptively switching two or more types of interpolation processing by one interpolation processing circuit 134a, instead of the signal processing apparatus 100 in the solid-state imaging apparatus 100a according to Embodiment 1. The remaining configuration is identical to that of the solid-state imaging apparatus 100a according to Embodiment 1.

In addition, the solid-state imaging apparatus 130a constitutes a camera system 1300 functioning as a digital camera, together with an optical system 100c for guiding light from a subject to a CCD image sensor 1. The optical system 100c is identical to the one in Embodiment 1.

Specifically, in the signal processing apparatus 130 of the CCD solid-state imaging apparatus 130a according to Embodiment 4, the interpolation processing section 134 comprises: an interpolation processing circuit 134a for changing a coefficient in an interpolation calculating formula that calculates a pixel signal of a target pixel to be a subject of interpolation from pixel signals of peripheral pixels positioned in the periphery of the target pixel, to achieve two or more types of interpolation processing; and an interpolation coefficient switching circuit 134b for selecting a coefficient of the interpolation calculating formula used in the interpolation processing circuit 134a based on a determination signal Dr indicating a determination result from a brightness or saturation determining section 103, and outputting coefficient information Ce indicating the selected coefficient to the interpolation processing circuit 134a.

The remaining configuration of the signal processing apparatus 130 in the CCD solid-state imaging apparatus 130a according to Embodiment 4 is identical to that of the signal processing apparatus 100 of the CCD solid-state imaging apparatus 100a according to Embodiment 1.

Next, the operation of Embodiment 4 of the present invention will be described.

In the signal processing apparatus 130, only the operation of the interpolation processing section 134 is different from the signal processing apparatus 100 according to Embodiment 1. The interpolation processing by this signal processing apparatus will thus be described hereinafter.

Figure 8:
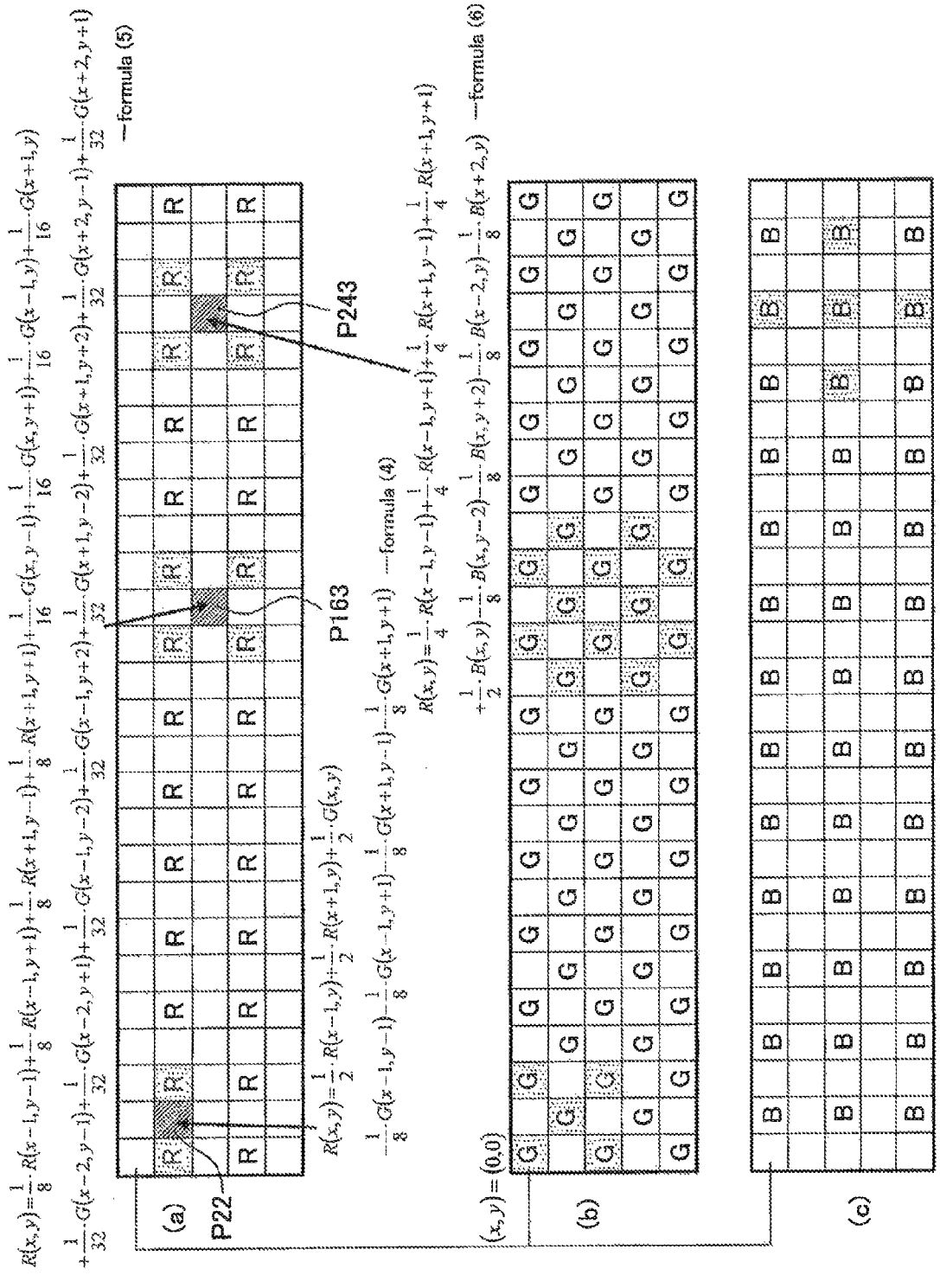
FIG. 8 is a diagram for describing an operation of a signal processing apparatus in a solid-state imaging apparatus according to Embodiment 4 of the present invention, showing an example of using an identical interpolation pixel for two different types of interpolation processing and of changing coefficients in a calculating formula used for interpolation.

FIG. 8 is a diagram for describing an operation of a signal processing apparatus in a CCD solid-state imaging apparatus 130a according to Embodiment 4 of the present invention, showing an example of using an identical interpolation pixel for two different types of interpolation processing and of changing coefficients in a calculating formula used for interpolation.

Herein, the operation will be described with an example of a case of interpolating a R pixel value of pixels P22, P163 and P243 shown in FIG. 4(a). In this example, the interpolation coefficient switching circuit 134b determines which coefficient to use from among two or more types of coefficients based on brightness or saturation of a target pixel.

Each of the calculating formulas for interpolating an R pixel value of pixels P22, P163 and P243 respectively is represented by using a coefficient k by a formula (1), a formula (2) and a formula (3) shown in FIG. 4(a).

Specifically, while the interpolation processing circuit 134a interpolates an R pixel value of a pixel using the formulas (1) to (3), it determines a coefficient in each of the formulas based on the coefficient information Ce from the interpolation coefficient switching circuit 134b.

For example, when the brightness or saturation of the pixels P22, P163 and P243 is determined as being greater than a predetermined threshold value, interpolation processing involving edge emphasis will be performed on these pixels. In this case, in the interpolation processing circuit 134a, the coefficient k of each of the formulas (1) to (3) will be determined so that the formulas (1) to (3) will be the formulas (4a) to (4c) shown in FIG. 14(a).

On the other hand, when the brightness or saturation of the pixel P163 is determined as being smaller than the predetermined threshold value, interpolation processing by averaging of pixel values will be performed on this pixel. In this case, in the interpolation processing circuit 134a, the coefficient k of the formula (2) (see FIG. 4(a)) will be determined so that the formula (2) will be the formula (5) shown in FIG. 8(a). It is noted that FIG. 8(a) shows a case of performing interpolation processing involving edge emphasis on the pixels P22 and P243, and the formulas (4) and (6) in FIG. 8(a) are identical to the formulas (4a) and (4c) in FIG. 14(a).

According to Embodiment 4 as described above, the interpolation processing section 134 is configured to comprise the interpolation processing circuit 134a for changing a coefficient in an interpolation calculating formula, which calculates a pixel signal of a target pixel to be a subject of interpolation, from pixel signals of peripheral pixels positioned in the periphery of the target pixel, to achieve a plurality of types of interpolation processing; and the interpolation coefficient switching circuit 134b for selecting a coefficient of the interpolation calculating formula used in the interpolation processing circuit 134a based on a determination signal Dr indicating a determination result from a brightness or saturation determining section 103, and outputting coefficient information Ce indicating the selected coefficient to the interpolation processing circuit 134a. Thus, the interpolation processing involving edge emphasis and the interpolation processing by averaging can be achieved by one interpolation circuit, thus simplifying the circuit configuration of the interpolation processing section 134.

Furthermore, the signal processing in the signal processing apparatus in the solid-state imaging apparatuses according to Embodiments 1 to 4 is executable by a computer in accordance with a signal processing programs and fundamental steps executed by the computer comprise: a step of determining brightness or saturation of the pixel for each pixel based on a pixel signal corresponding to the pixel; and a step of performing adaptive interpolation processing for calculating a pixel signal of a target pixel from pixel signals of peripheral pixels positioned in the periphery of the target pixel based on the determined brightness or saturation of the pixel. In the step of performing the adaptive interpolation processing, the adaptive interpolation processing is performed, by a computer, for switching the types of interpolation processing suitable for the determined brightness or saturation of the target pixel from among at least two types or more of interpolation processing.

In each of the steps, the types of adaptive interpolation processing illustrated in Embodiments 1 to 4 are performed.

Such a signal processing program is stored on a computer readable storage medium, and a computer reads the signal processing program from the storage medium to execute signal processing including the adaptive interpolation processing.

Embodiment 5

Figure 9:
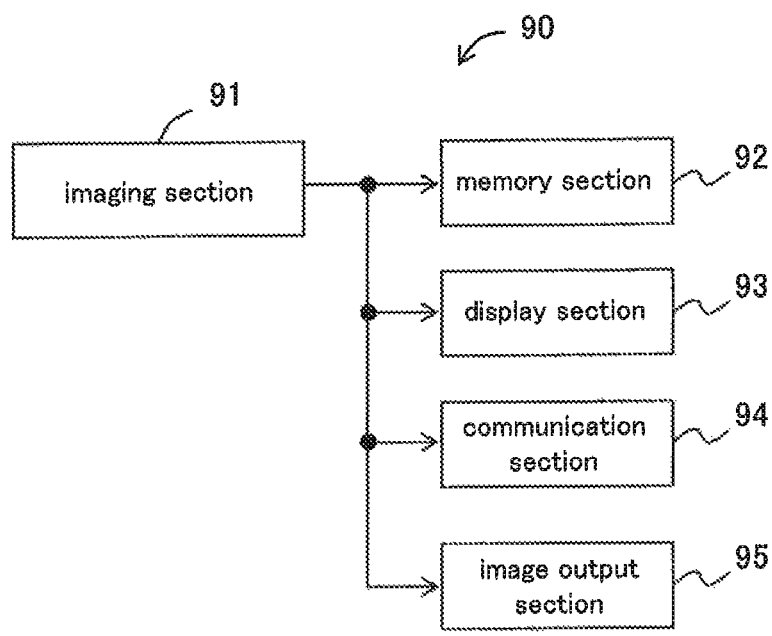
FIG. 9 is a block diagram showing an exemplary schematic configuration of an electronic information device, as Embodiment 5 of the present invention, comprising any of the solid-state imaging apparatuses according to Embodiments 1 to 4 used in an imaging section thereof.

FIG. 9 is a block diagram showing an exemplary schematic configuration of an electronic information device, as Embodiment 5 of the present invention, comprising any of the solid-state imaging apparatuses according to Embodiments 1 to 4 used in an imaging section thereof.

An electronic information device 90 according to Embodiment 5 of the present invention as shown in FIG. 9 comprises any of the solid-state imaging apparatuses according to Embodiments 1 to 4 of the present invention as an imaging section 91 for capturing a subject. The electronic information device 90 further comprises at least any of: a memory section 92 (e.g., recording media) for data-recording a high-quality image data obtained by using the imaging section, after predetermined signal processing is performed on the image data for recording; a display section 93 (e.g., liquid crystal display device) for displaying this image data on a display screen (e.g., liquid crystal display screen) after predetermined signal processing is performed for display; a communication section 94 (e.g., transmitting and receiving device) for communicating this image data after predetermined signal processing is performed on the image data for communication; and an image output section 95 for printing (typing out) and outputting (printing out) this image data.

As described above, the present invention is exemplified by the use of its preferred Embodiments. However, the present invention should not be interpreted solely based on Embodiments described above. It is understood that the scope of the present invention should be interpreted solely based on the claims. It is also understood that those skilled in the art can implement equivalent scope of technology, based on the description of the present invention and common knowledge from the description of the detailed preferred Embodiments of the present invention. Furthermore, it is understood that any patent, any patent application and any references cited in the present specification should be incorporated by reference in the present specification in the same manner as the contents are specifically described therein.

INDUSTRIAL APPLICABILITY

The present invention can be applied in the field of a signal processing apparatus and a signal processing method for adaptively switching interpolations of pixel signals between a bright area and a dark area on a screen; a solid state imaging apparatus equipped with the signal processing apparatus; an electronic information device equipped with the solid-state imaging apparatus; a signal processing program for allowing a computer to execute the signal processing method; and a computer readable storage medium for recording the signal processing program. In the present invention, it becomes possible to attain a signal processing apparatus and a signal processing method capable of reducing noise and improving S/N by interpolation in an area with low brightness or saturation on a display screen while increasing resolution by edge emphasis in an area with high brightness or saturation on the display screen; a solid-state imaging apparatus including the signal processing apparatus; an electronic information device comprising the solid-state imaging apparatus; an image processing program for allowing a computer to execute the signal processing methods and a computer readable storage medium for recording the signal processing program.

Herein, the solid-state imaging apparatus described above is a solid-state imaging apparatus for separating light into wavelengths using a color filter and obtaining color image signals to correspond to the human vision. The electronic information device described above is an electronic information device, such as a digital camera (e.g., a digital video camera or a digital still camera), an image input camera (e.g., a monitoring camera), a scanner, a facsimile machine, a television telephone device and a camera-equipped cell phone device, including the solid-state imaging apparatus as an image input device used in an imaging section thereof.

REFERENCE SIGNS LIST

1 CCD image sensor
90 electronic information device
91 imaging section
92 memory section
93 display section
94 communication section
95 image output section
100, 110, 120, 130 signal processing apparatus
100a, 110a, 120a, 130a solid-state imaging apparatus
100b CCD driving circuit
100c optical system
100d camera operation section
101 A/D converter
102 image buffer
103 brightness or saturation determining section
103a brightness or saturation detecting section
103b brightness or saturation comparing section
104 interpolation processing section
104a interpolation processing circuit [1]
104b interpolation processing circuit [2]
104c interpolation processing switching circuit
105a level adjusting circuit
105b image quality adjusting circuit
106 noise rejecting circuit
111, 113 fixed lens
112 movable lens
114 aperture mechanism
1000, 1100, 1200, 1300 camera system

The invention claimed is:

1. A signal processing apparatus for performing signal processing on pixel signals output from an imaging element, the imaging element having a plurality of pixels for photo-electrically converting light from a subject, the pixel signal corresponding to respective pixels, the signal processing apparatus comprising:
 a determination section for determining brightness or saturation at one or a plurality of pixels for each pixel; and
 an interpolation processing section for performing interpolation processing of interpolating a pixel signal of a target pixel using pixel signals of peripheral pixels positioned in the periphery of the target pixel based on the determined brightness or saturation of the pixel,
 wherein the interpolation processing section performs adaptive interpolation processing of selecting, for each pixel, interpolation processing suitable for the determined brightness or saturation of the target pixel, from among at least two or more types of interpolation processing, and interpolating a pixel signal of the target pixel by the selected interpolation processing,
 wherein:
 the two or more types of interpolation processing are for interpolating the pixel signal of the target pixel by using a pixel signal obtained by multiplying the pixel signals of the peripheral pixels by different coefficients; and
 for the coefficients in each type of the interpolation processing, coefficients obtained through continuous change based on the determined brightness or saturation of the target pixel are used.

2. A signal processing apparatus according to claim 1, wherein when the determined brightness of the target pixel is smaller than a predetermined threshold value, the interpolation processing section selects interpolation processing of mixing the pixel signals of the peripheral pixels.

3. A signal processing apparatus according to claim 1, wherein when the determined brightness of the target pixel is greater than a predetermined threshold value, the interpolation processing section selects interpolation processing involving edge emphasis of the target pixel using a difference of the pixel signals of the peripheral pixels.

4. A signal processing apparatus according to claim 1, wherein when the determined brightness of the target pixel is greater than a predetermined threshold value, the interpolation processing section selects interpolation processing of obtaining a gradient of the pixel signals of the peripheral pixels, selecting specific peripheral pixels from the plurality of peripheral pixels based on the gradient, and mixing pixel signals of the selected specific peripheral pixels.

5. A signal processing apparatus according to claim 1, wherein when the determined saturation of the target pixel is smaller than a predetermined threshold value, the interpolation processing section selects interpolation processing of mixing the pixel signals of the peripheral pixels.

6. A signal processing apparatus according to claim 1, wherein when the determined saturation of the target pixel is greater than a predetermined threshold value, the interpolation processing section selects interpolation processing involving edge emphasis of the target pixel using a difference of the pixel signals of the peripheral pixels.

7. A signal processing apparatus according to claim 1, wherein when the determined saturation of the target pixel is greater than a predetermined threshold value, the interpolation processing section selects interpolation processing of obtaining a gradient of the pixel signals of the peripheral pixels, selecting specific peripheral pixels from the plurality of peripheral pixels based on the gradient, and mixing pixel signals of the selected specific peripheral pixels.

8. A signal processing apparatus according to claim 1, wherein when edge emphasis is performed using a difference of the pixel signals of the peripheral pixels, the interpolation processing section selects interpolation processing of interpolating the pixel signal of the target pixel using the pixel signals of the peripheral pixels of colors different from the color of the pixel signal to be interpolated as the pixel signal of the target pixel.

9. A signal processing apparatus according to claim 1, wherein when the interpolation processing section performs interpolation processing of the target pixel by obtaining a gradient of the pixel signals in an area where the peripheral pixels are arranged, selecting specific peripheral pixels from the plurality of peripheral pixels based on the gradient, and mixing pixel signals of the selected specific peripheral pixels, the gradient is obtained by using the pixel signals of the peripheral pixels of colors different from the color of the pixel signal to be interpolated.

10. A signal processing apparatus according to claim 1, wherein the determining section determines brightness of the target pixel, using a highest brightness among the brightnesses of the respective pixels obtained from the pixels in an area including the peripheral pixels used for the interpolation processing.

11. A signal processing apparatus according to claim 1, wherein the determining section obtains saturation of the target pixel from a difference of pixel signals of green and red, and a difference of pixel signals of green and blue, from among the pixel signals of the peripheral pixels used for interpolation processing of the target pixel.

12. A signal processing apparatus according to claim 1, wherein the interpolation processing section is configured to restrict the adaptive interpolation processing based on a subject as a light source.

13. A signal processing apparatus according to claim 1, wherein the interpolation processing section is configured to restrict the adaptive interpolation processing if a gain in the imaging element during image-capturing is at or less than a fixed magnification.

14. A signal processing apparatus according to claim 1, wherein the interpolation processing section is configured to restrict the adaptive interpolation processing if the amount of light that the imaging element receives during image-capturing is at or more than a fixed amount of light.

15. A signal processing apparatus according to claim 1, wherein the interpolation processing section is configured to restrict the adaptive interpolation processing based on a light gathering state of an optical system for guiding light from the subject to the imaging element during image-capturing.

16. A signal processing apparatus according to claim 1, wherein the interpolation processing section is configured to restrict the adaptive interpolation processing based on a shutter speed of the imaging element during image-capturing.

17. A signal processing apparatus according to claim 1, wherein the interpolation processing section is configured to restrict the adaptive interpolation processing if it is determined that an image of a main subject is being captured against the light.

18. A signal processing apparatus for performing signal processing on pixel signals output from an imaging element, the imaging element having a plurality of pixels for photoelectrically converting light from a subject, the pixel signal corresponding to respective pixels, the signal processing apparatus comprising:
   a determination section for determining brightness or saturation at one or a plurality of pixels for each pixel; and
   an interpolation processing section for performing interpolation processing of interpolating a pixel signal of a target pixel using pixel signals of peripheral pixels positioned in the periphery of the target pixel based on the determined brightness or saturation of the pixel,
   wherein the interpolation processing section performs adaptive interpolation processing of selecting, for each pixel, interpolation processing suitable for the determined brightness or saturation of the target pixel, from among at least two or more types of interpolation processing, and interpolating a pixel signal of the target pixel by the selected interpolation processing,
   wherein the determining section uses, for determining brightness or saturation of the target pixel, pixel signals of a plurality of pixels, including pixels of different colors, in an area including the peripheral pixels used to interpolate the pixel signal of the target pixel.

19. A signal processing apparatus for performing signal processing on pixel signals output from an imaging element, the imaging element having a plurality of pixels for photoelectrically converting light from a subject, the pixel signal corresponding to respective pixels, the signal processing apparatus comprising:
   a determination section for determining brightness or saturation at one or a plurality of pixels for each pixel; and
   an interpolation processing section for performing interpolation processing of interpolating a pixel signal of a target pixel using pixel signals of peripheral pixels positioned in the periphery of the target pixel based on the determined brightness or saturation of the pixel,
   wherein the interpolation processing section performs adaptive interpolation processing of selecting, for each pixel, interpolation processing suitable for the determined brightness or saturation of the target pixel, from among at least two or more types of interpolation processing, and interpolating a pixel signal of the target pixel by the selected interpolation processing,
   wherein the two or more types of interpolation processing are interpolation processing using identical peripheral pixels, the interpolation processing preparing two or more different coefficients for a formula for obtaining the pixel signal of the target pixel from pixel signals of the identical peripheral pixels, and the interpolation processing determining which of the two or more of different coefficients to use based on brightness or saturation of the target pixel.

* * * * *